US012593748B2

(12) United States Patent
Frick et al.

(10) Patent No.: US 12,593,748 B2
(45) Date of Patent: Apr. 7, 2026

(54) AUTONOMOUS MACHINE HAVING VISION SYSTEM FOR NAVIGATION AND METHOD OF USING SAME

(71) Applicant: THE TORO COMPANY, Bloomington, MN (US)

(72) Inventors: Alexander Steven Frick, Farmington, MN (US); Michael Jason Ramsay, Verona, PA (US); David Arthur LaRose, Pittsburgh, PA (US); Stephen Paul Elizondo Landers, Pittsburgh, PA (US); Zachary Irvin Parker, Pittsburgh, PA (US); David Ian Robinson, Napier (NZ); Christopher Charles Osterwood, Exeter, NH (US)

(73) Assignee: THE TORO COMPANY, Bloomington, MN (US)

( * ) Notice: Subject to any disclaimer, the term of this patent is extended or adjusted under 35 U.S.C. 154(b) by 586 days.

(21) Appl. No.: 18/011,259

(22) PCT Filed: Jun. 23, 2021

(86) PCT No.: PCT/US2021/038663
§ 371 (c)(1),
(2) Date: Dec. 19, 2022

(87) PCT Pub. No.: WO2022/005840
PCT Pub. Date: Jan. 6, 2022

(65) Prior Publication Data
US 2023/0225241 A1 Jul. 20, 2023

Related U.S. Application Data

(60) Provisional application No. 63/047,423, filed on Jul. 2, 2020.

(51) Int. Cl.
*A01D 34/00* (2006.01)
*A01D 101/00* (2006.01)
(Continued)

(52) U.S. Cl.
CPC ......... *A01D 34/008* (2013.01); *G05D 1/0253* (2013.01); *G06T 7/215* (2017.01);
(Continued)

(58) Field of Classification Search
CPC .......................................... G06T 2207/10028
See application file for complete search history.

(56) References Cited

U.S. PATENT DOCUMENTS

| | | |
|---|---|---|
| 8,958,939 B2 | 2/2015 | Einecke et al. |
| 9,442,306 B1 | 9/2016 | Hines et al. |

(Continued)

FOREIGN PATENT DOCUMENTS

| | | |
|---|---|---|
| EP | 2199983 A1 | 6/2010 |
| WO | WO 2020/033522 A2 | 2/2020 |
| WO | WO 2022/005840 A1 | 1/2022 |

OTHER PUBLICATIONS

GitHub, Georgia Tech Smoothing and Mapping Library, "GTSAM is a library of C++ classes that implement smoothing and mapping (SAM) in robotics and vision, using factor graphs and Bayes networks as the underlying computing paradigm rather than sparse matrices" [Retrieved on Apr. 26, 2024]. Retrieved from the Internet: <URL: github.com/borglab/gtsam>; 6 pages.
(Continued)

*Primary Examiner* — Christian Chace
*Assistant Examiner* — Minato Lee Horner
(74) *Attorney, Agent, or Firm* — Mueting Raasch Group

(57) ABSTRACT
Vision systems for autonomous machines and methods of using same during machine localization are provided. Exemplary systems and methods may reduce computing resources
(Continued)

needed to perform vision-based localization by selecting the most appropriate camera from two or more cameras, and optionally selecting only a portion of the selected camera's field of view, from which to perform vision-based location correction. Other embodiments may provide camera lens coverings that maintain optical clarity while operating within debris-filled environments.

14 Claims, 14 Drawing Sheets

(51) Int. Cl.
| | | |
|---|---|---|
| *G05D 1/00* | (2024.01) | |
| *G06T 7/215* | (2017.01) | |
| *G06T 7/246* | (2017.01) | |

(52) U.S. Cl.
CPC .......... *G06T 7/246* (2017.01); *A01D 2101/00* (2013.01); *G06T 2207/10028* (2013.01)

(56) References Cited

U.S. PATENT DOCUMENTS

| | | | |
|---|---|---|---|
| 10,157,334 | B2 | 12/2018 | Schepelmann et al. |
| 10,310,510 | B2 | 6/2019 | Mannefred et al. |
| 2015/0163993 | A1* | 6/2015 | Pettersson ............ G05D 1/0251 |
| | | | 701/28 |
| 2016/0144505 | A1 | 5/2016 | Fong et al. |
| 2017/0303466 | A1 | 10/2017 | Grufman et al. |
| 2018/0253108 | A1 | 9/2018 | Heinla et al. |
| 2020/0050208 | A1 | 2/2020 | Frick et al. |

OTHER PUBLICATIONS

Extended European Search Report dated Sep. 16, 2024, for European Patent Application No. 24169983.4, 8 pages.

Davison, "Real-Time Simultaneous Localisation and Mapping with a Single Camera," Proceedings of the Ninth IEEE International Conference on Computer Vision (ICCV'03), 2003, 8 pages.

Eade et al., "Scalable Monocular SLAM," Proceedings of the 2006 IEEE Computer Society Conference on Computer Vision and Pattern Recognition (CVPR'06), 2006, 8 pages.

International Search Report/Written Opinion for PCT Application No. PCT/US2021/038663; Oct. 14, 2021, 11 pages.

International Preliminary Report on Patentability for PCT Application No. PCT/US2021/038663; Jun. 14, 2022, 17 pages.

Tomasi et al., "Shape and Motion from Image Streams under Orthography: a Factorization Method," International Journal of Computer Vision, 9:2, 137-154, 1992, 18 pages.

* cited by examiner

AUTONOMOUS MACHINE HAVING VISION SYSTEM FOR NAVIGATION AND METHOD OF USING SAME

The present application is a 35 U.S.C. § 371 U.S. National Stage of International Application No. PCT/US2021/038663, filed Jun. 23, 2021, which claims priority to and/or the benefit of U.S. Provisional Patent Application No. 63/047,423, filed 2 Jul. 2020, both of which are incorporated herein by reference in their entireties.

Embodiments of the present disclosure relate to autonomous machine navigation and, more particularly, to vision-based or vision-assisted autonomous machine navigation.

BACKGROUND

Ground maintenance vehicles such as turf maintenance machines are known for performing a variety of tasks. For instance, powered lawn mowers are used by both homeowners and professionals alike to maintain areas within a property or yard. Lawn mowers that autonomously perform a grass cutting function are also known and typically operate within a work region contained within a predefined boundary of the yard. Such mowers may rely upon navigation systems that assist in autonomously confining the mower within the predefined boundary. For example, boundaries may be defined by buried wires detectable by the mower. In such instances, the mower may be configured to move randomly within the confines of the wired boundary, wherein the mower's trajectory is redirected upon each encounter with the wire.

Other mowers may include navigation systems that utilize one or more non-vision-based sensors and one or more vision-based sensors to navigate the work region. Examples of such vision-based or vision-assisted systems are described in U.S. Pat. Pub. No. 2020/0050208.

SUMMARY

Systems and methods in accordance with embodiments of the present disclosure may reduce utilization of vision-related computing resources and, moreover, provide the autonomous machine with greater flexibility in using the vision system for various tasks. Below is provided a non-exhaustive listing of non-limiting examples or aspects of the present disclosure. Any one or more of the features identified in these aspects may be combined with any one or more features of another aspect also described herein.

A first aspect of the present disclosure includes a method for autonomous machine navigation that includes placing a ground maintenance machine within a work region defined by one or more boundaries. The machine includes: two or more vision sensors, wherein each vision sensor is adapted to capture image data within a field of view (FOV) defined by the vision sensor, and wherein each vision sensor defines a different FOV relative to the machine; and a controller in communication with each of the vision sensors. The method further includes: designating at least one of the vision sensors as a localization vision sensor; and determining with the controller a vision-based pose of the machine, the pose representing one or both of a position and an orientation of the machine relative to the work region. Determining the pose of the machine is based upon matching features in the image data received from the localization vision sensor to features associated with a previously-identified three-dimensional point cloud (3DPC) used to define the work region.

In another aspect according to the first aspect, designating the localization vision sensor includes: analyzing the image data from each of the vision sensors; identifying a first vision sensor from among the two or more vision sensors, wherein the FOV of the first vision sensor contains a greater number of feature matches with features of the 3DPC than the FOV of any of the other vision sensors; and selecting the first vision sensor as the localization vision sensor. In another aspect according to any preceding aspect, designating the localization vision sensor comprises selecting which of the vision sensors has the FOV that is predicted by the controller to contain either: a greater number of features of the 3DPC; or a feature or cluster of features having a recognition score greater than a recognition score of the features or cluster of features predicted to be withing the FOV of any of the other vision sensors. In still another aspect according to any preceding aspect, designating the localization vision sensor comprises: dividing the FOV of each vision sensor into a first zone and a second zone; predicting based upon the pose of the machine as estimated by the controller, either a number of features, or a recognition score of features, of the 3DPC contained within the first zone of the FOV of each of the vision sensors; and designating the localization vision sensor to be the vision sensor having the first zone predicted by the controller to contain either: the greatest number of features of the 3DPC; or the greatest recognition score of features of the 3DPC. In yet another aspect according to any preceding aspect, matching features in the image data comprises: dividing the FOV of one or more of the vision sensors into a first zone and a second zone; and matching features in the image data to features associated with the 3DPC using only the image data from the first zone. In still another aspect according to any preceding aspect, dividing the FOV comprises dividing the FOV such that the first zone is located vertically above the second zone. In yet another aspect according to any preceding aspect, the method further includes: collecting visual odometry data from one or more of the vision sensors; and correcting the pose of the machine based upon the visual odometry data. In still yet another aspect according to any preceding aspect, the two or more vision sensors comprise four vision sensors. In another aspect according to any preceding aspect, the two or more vision sensors comprise a front-facing camera, a rear-facing camera, a left-facing camera, and a right-facing camera. In yet another aspect according to any preceding aspect, at least one of the vision sensors includes a lens covering, the lens covering comprising one or more of a hydrophilic lens covering, a hydrophobic lens covering, an anti-reflective lens covering, an anti-glare lens covering, a polarizing filter, and one or more removable layers.

In another independent aspect of the present disclosure, an autonomous ground maintenance machine is provided having: a housing supporting a ground maintenance implement; drive wheels supporting the housing in rolling engagement with a ground surface of a work region; a propulsion system coupled to the drive wheels and adapted to control rotational speed and direction of the drive wheels; a vision system comprising at least two cameras, wherein each camera captures image data within a field of view (FOV) different than the FOV of the other camera(s), and wherein one of the cameras is designated as a localization camera; and a controller operatively coupled to the vision system. The controller is adapted to determine a vision-based pose of the machine, the pose representing one or both of a position and an orientation of the machine relative to the work region. The determination of the pose is based upon matching features in the image data from the localization camera to features associated with a previously-identified three-dimensional point cloud (3DPC) used to define the work region.

In another aspect according to any preceding aspect, one or more of the cameras is designated as a visual odometry camera adapted to provide visual odometry data to the controller. In still another aspect according to any preceding aspect. the visual odometry camera has a FOV directed transverse to a direction of travel of the machine. In yet another aspect according to any preceding aspect, the localization camera and the visual odometry camera are the same camera or, alternatively, the localization camera and the visual odometry camera are different cameras. In still another aspect according to any preceding aspect, the controller is adapted to: determine whether the drive wheels have slipped relative to the ground surface based upon the visual odometry data; and update the vision-based pose of the machine in response to determining that the drive wheels have slipped. In yet another aspect according to any preceding aspect, the FOV of each camera is divided into a first zone and a second zone. In another aspect according to any preceding aspect, image data of the first zone of the FOV of each camera is provided to the controller for matching features with the 3DPC, and the image data of the second zone of the FOV of each camera is adapted to provide the visual odometry data to the controller. In yet another aspect according to any preceding aspect, the FOV of each camera extends 30-60 degrees above a horizontal plane. In still yet another aspect according to any preceding aspect, one or more of the cameras comprises a lens covering, the lens covering comprising one or more of hydrophilic lens covering, a hydrophobic lens covering, an anti-reflective lens covering, an anti-glare lens covering, a polarizing filter, and one or more removable layers.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
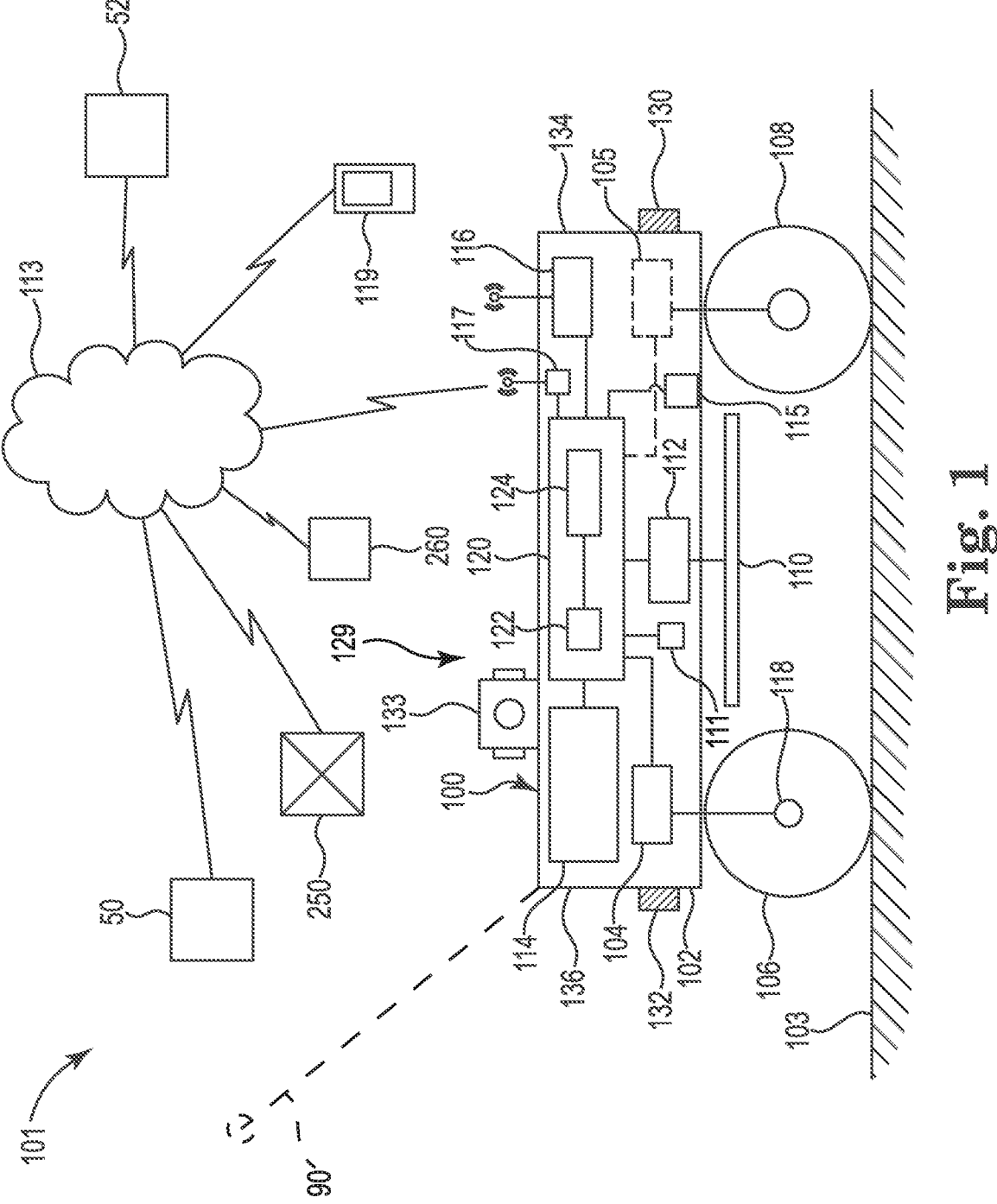
FIG. 1 is a diagrammatic side elevation view of an autonomous working machine (e.g., ground maintenance machine such as an autonomous lawn mower) in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. The term "i.e." is used as an abbreviation for the Latin phrase id est and means "that is." The term "e.g." is used as an abbreviation for the Latin phrase exempli gratia and means "for example."

Some aspects described herein relate to defining a boundary of a work region using a vision system and a non-vision-based sensor, and/or to correcting or updating an estimated position of a machine within the work region using the vision system. The vision system may utilize one or more vision-based sensors each including a camera. Images may be initially recorded by directing the autonomous machine along a desired boundary path (e.g., during a training mode). Algorithms may be used to extract features, to match features between different images, and to generate a three-dimensional point cloud (3DPC, or 3D point cloud) corresponding to at least the work region (e.g., during an offline mode). Positions and orientations of the autonomous machine during image recording may be determined for various points in the 3DPC, for example, based on the positions of various points in the 3DPC and positions of the corresponding features in the recorded images. Positions and orientations may also be recovered directly during generation of the 3DPC. At least the position information may be used to determine a boundary for the work region for subsequent navigation of the autonomous machine in the work region. During operation (e.g., during an online mode), the vision system may record operational images and determine a vision-based position and orientation of the autonomous machine. The vision-based position may be used to update, or correct errors in, a determined or estimated position based on non-vision-based sensors (e.g., odometry sensors). Various aspects described herein relate to reducing computing resources needed (e.g., for image processing) to provide the desired vision system functionality, and to increase flexibility in camera utilization (e.g., simultaneously permit one or more cameras to be used for localization, one or more cameras to be used for object classification, one or more cameras to be used for visual odometry, etc.).

As used herein, "property" is defined as a geographic region (such as a yard) circumscribed by a fixed boundary within which the machine (e.g., mower) may perform work (e.g., mow grass). "Work region" (see work region 181 bounded by boundary 183 in FIG. 2) is used herein to refer to those areas contained (or mostly contained) within the boundary of the property within which the machine will perform work. For example, work regions could be defined by grass surfaces of the property or yard upon which an autonomous lawn mower will perform its maintenance functions (e.g., cut grass). A property may contain one or more work regions including, for example, a front-yard area and a back-yard area, or two yard areas separated by a sidewalk or driveway. "Exclusion zone" is defined herein as an area contained within the property in which the machine is not intended to perform its normal maintenance task (e.g., not intended to mow grass). Examples of exclusion zones include landscaped or garden areas, pools, buildings, driveways, and other yard features. "Transit zones" may be used herein to refer to paths through exclusion zones that the machine may take when travelling between different work regions of the property. Typically, the machine will not perform a maintenance task (mowing) when moving through a transit zone.

As used herein, the term "three-dimensional point cloud," "3D point cloud," or "3DPC" is a data structure that represents or contains three-dimensional geometric points which correspond to features extracted from images. The 3DPC may be associated with various mower properties, such as poses. In some embodiments, the geometric points and poses may or may not be defined in a coordinate system based on an arbitrary frame of reference. In some embodiments, the 3DPC may or may not be associated with a scale, orientation, or both that is tied to the real-world, for example, until a map registration process has been performed. The 3DPC may be generated based on feature data. A graph, or visual map, may be generated based on the 3DPC to provide a human-viewable representation of the 3DPC.

The term "feature" may be used herein to refer to two-dimensional (2D) data that results from identifying one or more points, in particular key points or points of interest, in a two-dimensional image. Features may be identified in and extracted from an image using a feature detector algorithm. Any suitable feature detector algorithm available to one having ordinary skill in the art may be used depending on the particular autonomous machine and application. In some embodiments, each unique feature refers to only one point, or point of interest, in an image or 3DPC. The feature may be stored as feature data containing coordinates defined relative to the image frame. In some embodiments, feature data may also include a descriptor applied to, associated with, or corresponding to the feature. The term "feature data" refers to a data structure that represents features and may include a two-dimensional position and a multi-dimensional descriptor (e.g., two-dimensional or three-dimensional).

The terms "determine" and "estimate" may be used interchangeably herein depending on the particular context of their use, for example, to determine or estimate a position or pose of the mower 100 or a feature. The term "pose" is used herein to refer to a position and orientation of an object (e.g., the mower 100). The pose may be a six-degrees of freedom pose (6DOF pose), which may include all position and orientation parameters for a three-dimensional space. Pose data may include a three-dimensional position and a three-dimensional orientation. For example, the position may include at least one position parameter selected from: an x-axis, a y-axis, and a z-axis coordinate (e.g., using a Cartesian coordinate system). Any suitable angular orientation representations may be used. Non-limiting examples of angular orientation representations include a yaw, pitch, and roll representation, a Rodrigues' representation, a quaternions representation, and a direction cosine matrix (DCM) representation may also be used alone or in combination. In one example, the orientation may include at least one orientation parameter selected from yaw (e.g., rotation about a vertical z-axis), pitch (e.g., rotation about a transverse y-axis), and roll (e.g., rotation about a longitudinal x-axis).

It is noted that the terms "have," "include," "comprise," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the machine 100 is in an operating configuration (e.g., while the machine 100 is positioned such that wheels 106 and 108 rest upon a generally horizontal ground surface 103 as shown in FIG. 1). These terms are used only to simplify the description, however, and not to limit the interpretation of any embodiment described.

While illustratively described herein as an autonomous mower, such a configuration is exemplary only as systems and methods in accordance with embodiments of the present disclosure also have application to other autonomous maintenance machines. As used herein, "maintenance machine" may include most any machine configured to provide an outdoor or indoor maintenance function. Examples of maintenance machines include, but are not limited to: residential and commercial mowing products (e.g., riding fairway or greens mowers that are driven by a user); ground maintenance machines or vehicles (e.g., debris blowers/vacuums, aerators, dethatchers, material spreaders, snow throwers, weeding machines for weed remediation); indoor working machines such as vacuums and floor scrubbers/cleaners (e.g., that may encounter obstacles); construction and utility vehicles (e.g., trenchers); observation vehicles; and load transportation vehicles. While described in the context of maintenance machines, embodiments as described herein may also find application to human transport vehicles. Furthermore, the autonomous maintenance machines described herein may employ various types of navigation, such as random, modified random, or specific path planning, to carry out their intended functionality. The terms "maintenance machine" and "working machine" may be used interchangeably herein.

While the construction of the actual working machine is not necessarily central to an understanding of embodiments of this disclosure, FIG. 1 schematically illustrates an exemplary autonomous working machine configured as an autonomous lawn mower 100 (also referred to herein as "machine" or "robot"), which forms part of a lawn mowing system 101 that may include other components such as a charging station 50. As shown in FIG. 1, the mower 100 may include a housing 102 (e.g., frame or chassis with a shroud) that carries and/or encloses various components of the mower as described below. The mower 100 may further include ground support members, such as wheels, rollers, skids, or tracks. In the illustrated embodiment, the ground support members include one or more rear wheels 106 and one or more front wheels 108, that support the housing 102 upon (and in rolling engagement with) the ground (e.g., turf) surface 103 of the work region. As illustrated, the front wheels 108 support at least a front-end portion 134 of the housing 102 and the rear wheels 106 support at least a rear-end portion 136 of the mower housing.

One or both rear wheels 106 may form drive wheels coupled to and driven by a propulsion system (e.g., including one or more wheel motors 104) to propel the mower 100 over the ground surface 103. In some embodiments, the front wheels 108 may freely caster relative to the housing 102 (e.g., about vertical axes). In such a configuration, mower direction may be controlled via differential rotation of the two rear wheels 106 in a manner similar to a conventional zero-turn-radius (ZTR) riding mower. That is to say, the propulsion system may include a separate wheel motor 104 for each of a left and right rear wheel 106 (see FIG. 2) so that a rotational speed and direction of each rear (drive) wheel may be independently controlled by the propulsion system. In addition, or alternatively, the front wheels 108 could be actively steerable by the propulsion system (e.g., including one or more steer motors 105) to assist with control of mower 100 direction, and/or could be driven by the propulsion system (i.e., to provide a front-wheel or all-wheel drive mower).

A ground maintenance implement or tool (e.g., a grass cutting element, such as a blade 110) may be coupled to an implement (e.g., cutting) motor 112 and supported by the housing 102. When the motors 112 and 104 are energized, the mower 100 may be propelled over the ground surface 103 such that vegetation (e.g., grass) over which the mower passes is cut by the rotating blade 110. While illustrated herein using only a single blade 110 and/or cutting motor 112, mowers incorporating multiple blades, powered by single or multiple motors, are contemplated within the scope of this disclosure. Moreover, while described herein in the context of one or more conventional "blades," other cutting elements including, for example, disks, nylon string or line elements, knives, cutting reels, etc., are certainly possible without departing from the scope of this disclosure. Still further, embodiments combining various cutting elements, e.g., a rotary blade with an edge-mounted string trimmer, are also contemplated.

The mower 100 may further include a power source, which in one embodiment, is a battery 114 having a lithium-based chemistry (e.g., lithium-ion). Other embodiments may utilize batteries of other chemistries, or other power source technologies (e.g., solar power, fuel cell, internal combustion engines) altogether, without departing from the scope of this disclosure. It is further noted that, while shown as using independent blade and wheel motors, such a configuration is illustrative only as embodiments wherein blade and wheel power are provided by a single motor are also contemplated.

As shown in FIG. 1, the mower 100 may further include one or more sensors to provide location data. For instance, some embodiments may include a Global Navigational Satellite System (GNSS, e.g., global positioning system or "GPS") receiver 116 (or other position sensor that may provide similar data). The GNSS receiver 116 may be adapted to estimate a position of the mower 100 within the work region and provide such information to an electronic controller 120 (described below) associated with the working machine (mower 100). The controller, among other uses, is adapted to autonomously control navigation of the machine as the machine traverses the property/work region defined by the property boundary(s). In other embodiments, one or more of the wheels 106, 108 may include encoders 118 that provide wheel rotation/speed information (odometry) that may be used to estimate mower position (e.g., based upon an initial start position) within a given work region. The mower 100 may optionally include a sensor 115 adapted to detect a boundary wire, which could be used in addition to other non-vision-based or vision-based navigational techniques. Other sensors, such as an inertial measurement unit (IMU) 111, may also be included to assist with machine navigation. An IMU is an electronic device that is capable of measuring and outputting the angular rate, mass-specific force (acceleration) and, optionally, the orientation of a body in space.

The mower 100 may optionally include one or more front obstacle detection ("bump") sensors 130 and one or more rear obstacle detection sensors 132, as well as other sensors, such as side obstacle detection sensors (not shown). The obstacle detection sensors 130, 132 may be used to detect an obstacle in the path of the mower 100 when travelling in a forward or reverse direction, respectively (the mower 100 may be capable of mowing while moving in both forward and reverse directions). As illustrated, the sensors 130, 132 may be located at the front-end portion 134 and rear-end portion 136 of the mower 100, respectively. In addition to the sensors described, other sensors now known or later developed may also be incorporated into the mower 100.

The sensors 130, 132 may use contact sensing, non-contact sensing, or both types of sensing. For example, both contact and non-contact sensing may be enabled concurrently or only one type of sensing may be used depending on the status of the mower 100. One example of contact sensing includes using a contact bumper protruding from the housing 102, or the housing itself, that can detect when the mower 100 has contacted the obstacle. Non-contact sensors may use acoustic or light waves to detect the obstacle, sometimes at a distance from the mower 100 before contact with the obstacle (e.g., using infrared, radio detection and ranging (radar), light detection and ranging (lidar), etc.).

The mower 100 may carry or otherwise include a vision system 129 that includes, among other elements, at least two vision-based sensors (also referred to herein as "vision sensors" and "cameras") adapted to capture image data and ultimately provide localization information, such as pose (position and orientation) and/or velocity. Each vision-based sensor may include a camera 133 operatively coupled or otherwise in communication with the controller 120 (e.g., the vision system may be operatively coupled to the controller). Each camera may capture or record digital images (also referred to herein as "image data") for use with the vision system. Accordingly, the cameras 133, as well as the controller 120, may be described as part of the vision system 129 of the mower 100. Types of image data include, for example, training image data and/or operational image data. Image data may be processed and used, for example: to build a 3DPC, for location correction, for visual odometry as described below, and/or for object detection or classification, among others.

The one or more cameras may be capable of detecting visible light, non-visible light, or both. The one or more cameras may establish a total field of view of at least 30 degrees, at least 45 degrees, at least 60 degrees, at least 90 degrees, at least 120 degrees, at least 180 degrees, at least 270 degrees, or even 360 degrees, around the autonomous machine (e.g., mower 100). The field of view may be defined in a horizontal direction, a vertical direction, or both directions. For example, a total horizontal field of view may be 360 degrees, and a total vertical field of view may be 45-90 degrees. The field of view may capture image data above and below the height of the one or more cameras.

Figure 2:
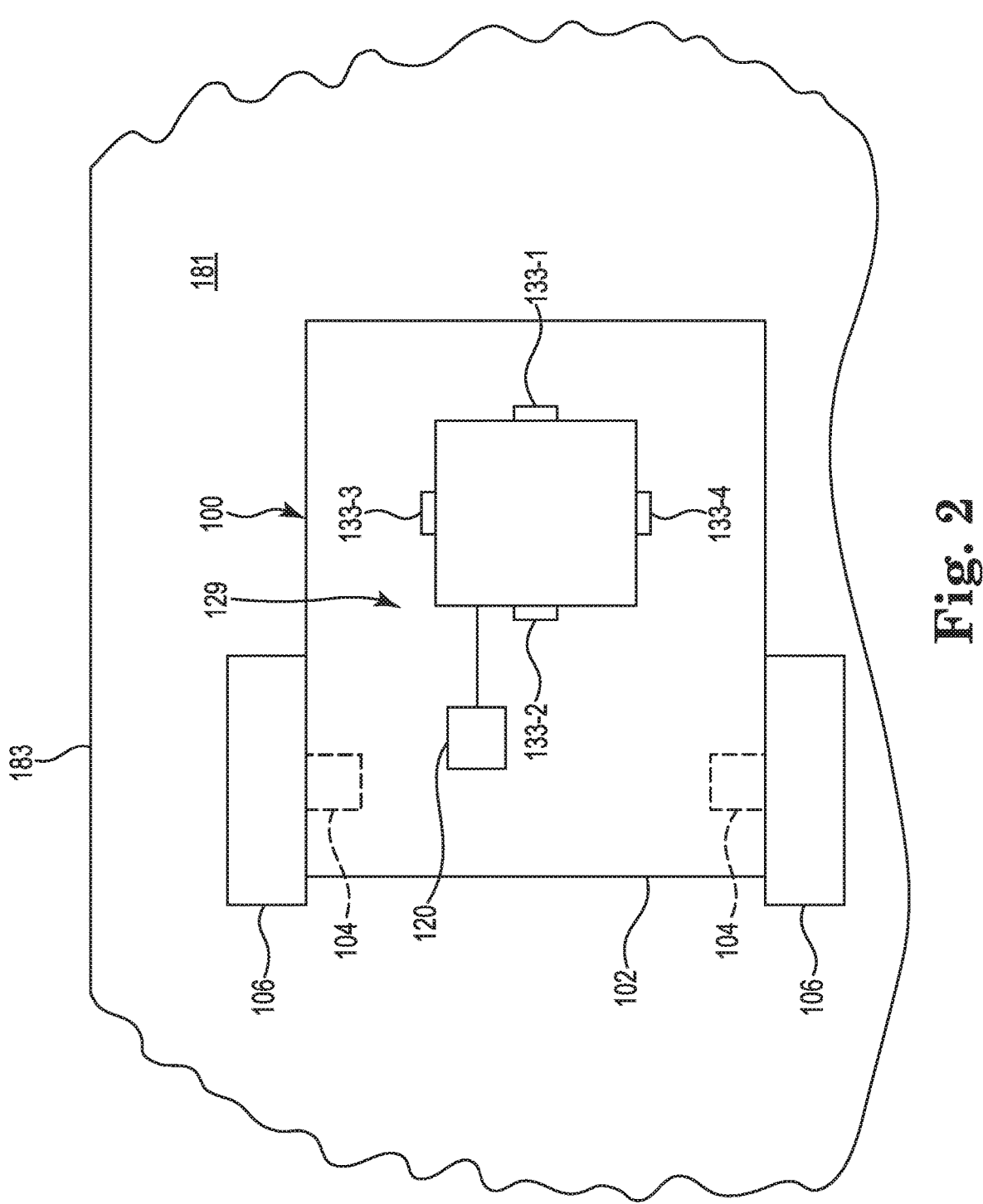
FIG. 2 is a diagrammatic top plan view of the machine of FIG. 1.
Figure 3:
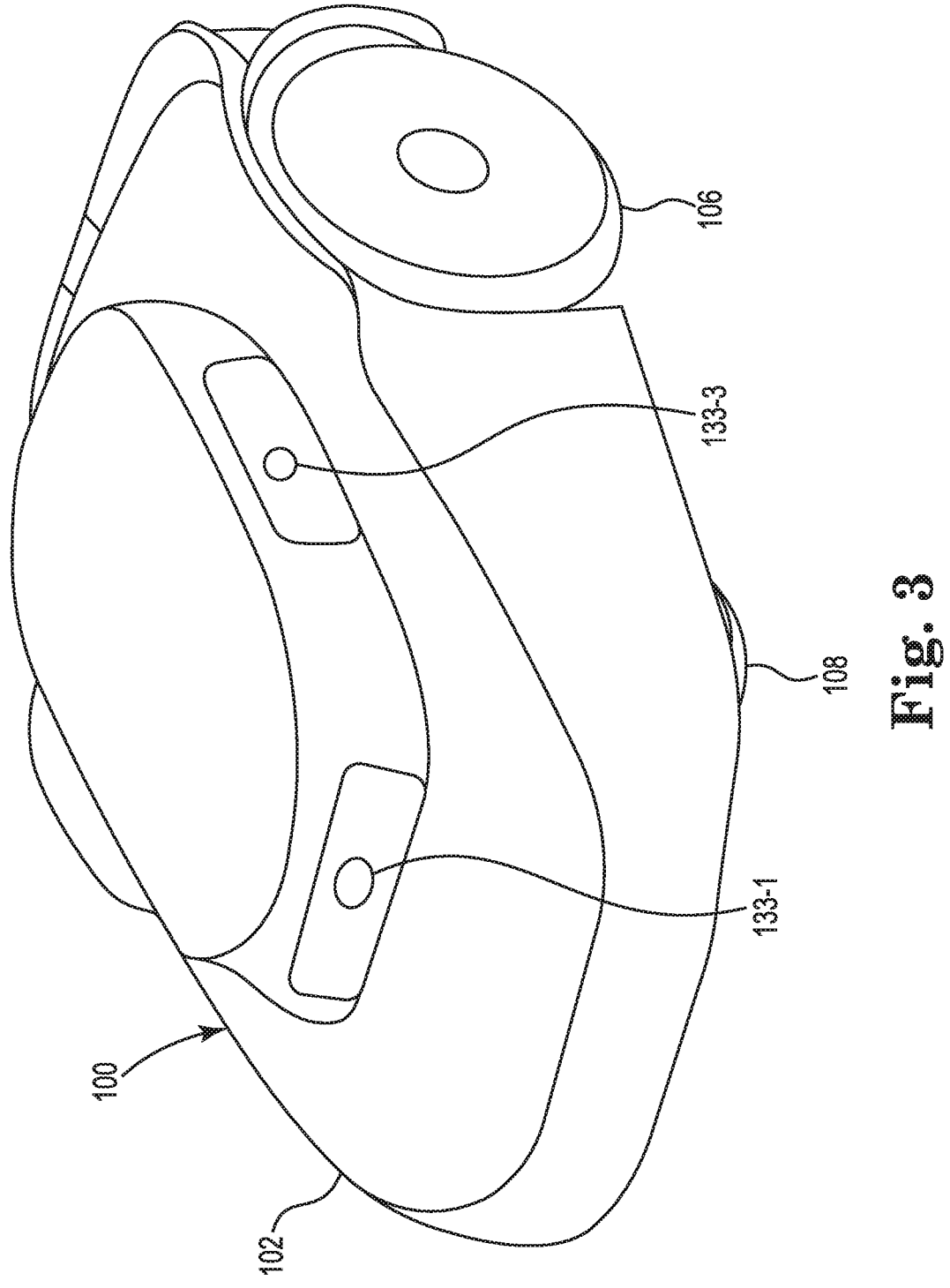
FIG. 3 is a left front perspective view of an autonomous lawn mower in accordance with embodiments of the present disclosure.
Figure 4:
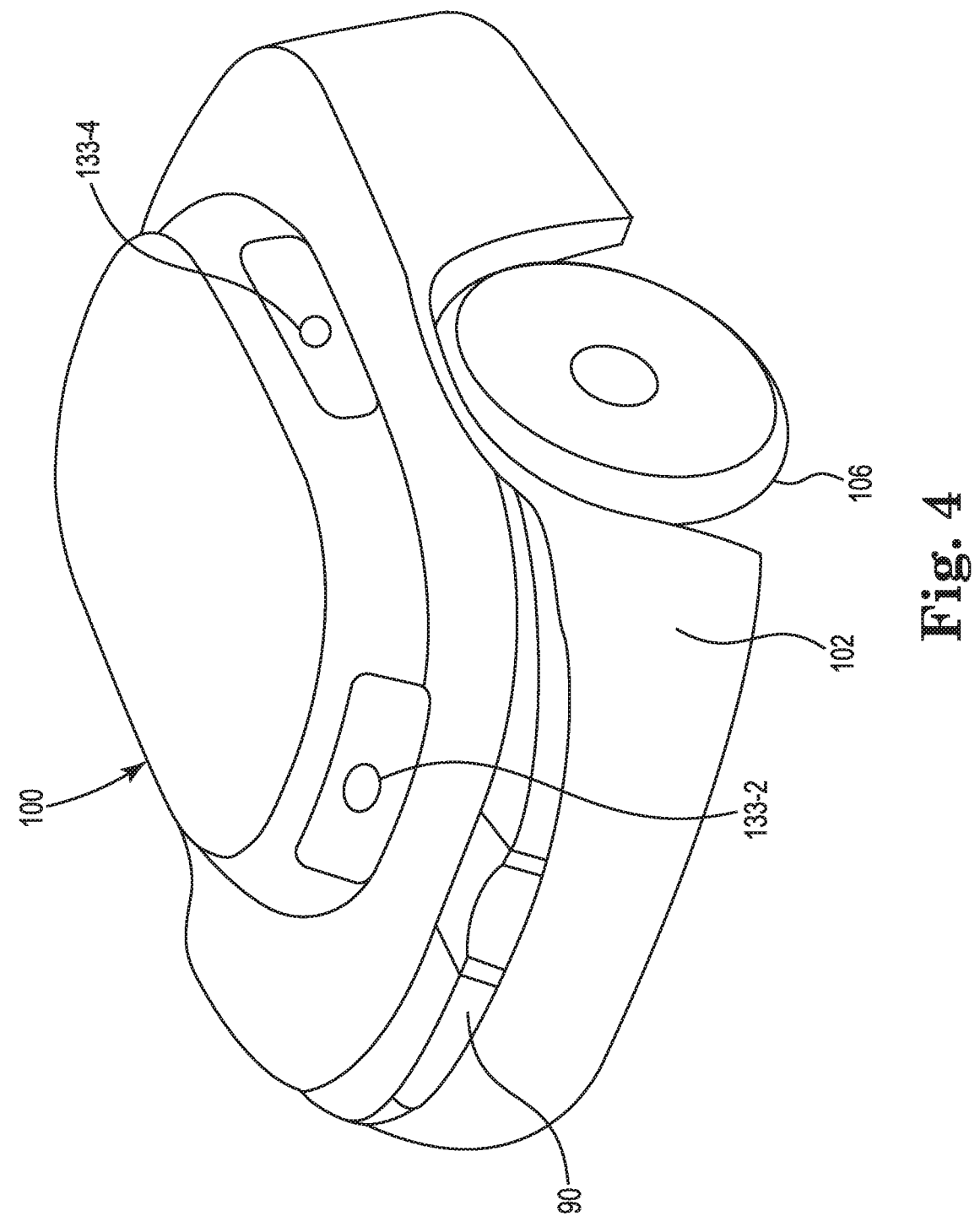
FIG. 4 is a right rear perspective view of the mower of FIG. 3.

In some embodiments, the mower 100 includes four vision sensors each having a camera 133 (e.g., cameras 133-1, 133-2, 133-3, and 133-4; collectively and individually referred to as camera or cameras 133) as shown in FIGS. 2, 3 and 4. One camera 133 may be positioned in each of one or more directions including a forward direction (front-facing camera 133-1), a reverse direction (rear-facing camera 133-2), a first side direction (left-facing camera 133-3), and a second side direction (right-facing camera 133-4), thereby forming Cardinal directions relative to the mower 100. One or more camera directions may be positioned orthogonal to one or more other cameras 133 or positioned opposite to at least one other camera 133. Although not shown, the cameras 133 may also be offset from any of these directions (e.g., at a 45 degree or another non-right angle, at corners of the vehicle, or otherwise placed to provide additional overlap in one (e.g., front) or more directions, etc.). FIGS. 3 and 4 illustrate opposite isometric views of an exemplary mower 100 showing the arrangement of cameras 133-1, 133-2, 133-3, and 133-4.

Accordingly, sensors associated with the mower 100 may be described as either vision-based sensors or non-vision-based sensors. As stated above, the vision-based sensors may include the cameras 133, while the non-vision-based sensors may include any sensors that are not cameras. For example, the wheel encoders 118 (e.g., using optical (e.g., photodiode), magnetic, inductive (e.g., eddy current), or capacitive sensing to detect wheel revolutions) may be described as non-vision-based sensors. Such encoding data from the wheel encoders may be described herein as odometry data. Other non-vision-based sensors may include, for example, the IMU 111 and GNSS receiver 116.

As further described below, one or more of the cameras 133 may be used as an optical encoder. In this context, the camera may capture a series or sequence of images and compare features in those images to determine or estimate a distance the mower has traveled between the images ("optical flow"). Optical encoding may provide various benefits over wheel encoders 118 including, for example, less susceptibility to errors resulting from wheel slippage relative to the ground surface 103.

The controller 120 (see FIG. 1) is adapted to monitor and control various mower functions. Accordingly, the controller 120 may include a processor 122 that receives various inputs and executes one or more computer programs or applications stored in memory 124. The memory 124 may include computer-readable instructions or applications that, when executed, e.g., by the processor 122, cause the controller 120 to perform various calculations and/or issue commands. That is to say, the processor 122 and memory 124 may together define a computing apparatus operable to process input data and generate the desired output to one or more components/devices. For example, the processor 122 may receive various input data including positional data from the GNSS receiver 116 and/or wheel encoders 118 and generate speed and steering angle commands to the wheel motor(s) 104 to cause the rear wheels 106 to rotate (at the same or different speeds and in the same or different directions). In other words, the controller 120 may control the steering angle (vehicle heading) and speed of the mower 100, as well as the speed and operation of the cutting blade 110.

The controller 120 may use the processor 122 and memory 124 in different systems. Alternatively, one or more processors 122 and memory 124 may be included in each different system. For example, the controller 120 may form part of the vision system 129, which may include a processor 122 and memory 124. The controller 120 may also at least partially define a navigation system, which may also include a processor 122 and memory 124 the same or separate from the processor 122 and memory 124 of the vision system. Still further, the controller 120 may also at least partially define a propulsion system, which may also include a processor 122 and memory 124 the same or separate from the processor 122 and memory 124 of the vision system and/or of the navigation system. In general, the term "controller" may be used herein to describe components of a system that receive inputs and provide outputs and commands to control various components of the system.

A communication system may be provided to permit the mower 100/controller 120 to operatively communicate (e.g., via a wireless radio 117) with a communication network that may include a wireless network 113, thereby allowing communication (e.g., bidirectional communication) between the mower and other devices. For example, the wireless network 113 may be a cellular or other wide area network, a local area network (e.g., Institute of Electrical and Electronics Engineers (IEEE) 802.11 local "Wi-Fi" network), or a personal area or peer-to-peer network ("P2P," e.g., "Bluetooth" network). Other devices may communicate over the wireless network with the mower 100, including, for example, a remote computer 119, which may be configured as a cellular phone, tablet, desktop computer, notebook computer, or wearable computer. Preferably, the wireless network 113 is connected to the internet so that the user/remote computer 119 may interact with the communication system regardless of the user's location. Moreover, connection of the wireless network 113 to the internet allows communication with most any other remote computer including, for example, an internet- or "cloud-" connected server 52.

The communication system may also permit communication over the wireless network 113 with conventional network hardware including gateways 250, routers, wireless access points, home automation controllers 260, etc.

While illustrated as using a centralized communication network (e.g., wherein each device connects to a central network), other embodiments may utilize a decentralized or ad-hoc network, wherein communication occurs directly between devices. For example, the mower may communicate directly with the remote computer 119 rather than communicate indirectly over the wireless network 113. Still further, while illustrated as primarily utilizing wireless communication protocols, such a configuration is not limiting as for example, various devices (e.g., the charging station 50 and/or the gateway 250) could connect to the communication network or other devices using wired connections without departing from the scope of this disclosure.

It will be readily apparent that the functionality of the controller 120 may be implemented in any manner known to one skilled in the art. For instance, the memory 124 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 124 and the processor 122 could be contained in separate modules.

The processor 122 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 122 may include multiple components, such as any combination of one or more microprocessors, one or more controllers, one or more DSPs, one or more ASICs, and/or one or more FPGAs, as well as other discrete or integrated logic circuitry. The functions attributed to the controller 120 and/or processor 122 herein may be embodied as software, firmware, hardware, or any combination of these. Certain functionality of the controller 120 may also be performed in the "cloud" (e.g., at the server 52) or other distributed computing system operatively connected to the processor 122.

In FIG. 1, schematic connections are generally shown between the controller 120 and the battery 114, wheel motor(s) 104, cutting motor 112, optional boundary wire sensor 115, wireless radio 117, and GNSS receiver 116. This interconnection is illustrative as the various subsystems of the mower 100 could be connected in most any manner, e.g., directly to one another, wirelessly, via a bus architecture (e.g., controller area network (CAN) bus), or any other connection configuration that permits data and/or power to pass between the various components of the mower. Although connections with some of the sensors 130, 132, and 133 are not shown, these sensors and other components of the mower 100 may be interconnected in a similar manner.

As stated above, various functionality of the controller 120 described herein may be offloaded from the mower 100. For example, image data could be transmitted to a remote server (e.g., internet-connected server 52) using the wireless radio 117 and then processed or stored. Alternatively, some functionality of the controller 120 could be provided by components on the charging station 50 and/or the remote computer 119.

As indicated above, the exemplary mower 100 may be initially trained, after which the mower may autonomously operate within the work region as described in U.S. Pat. Pub.

No. 2020/0050208 (the "'208 Publication"). The mower 100 may utilize the vision and navigation systems to permit such autonomous operation.

As described in the '208 Publication, the mower 100 may first be guided along a path, for example, in a manual manner using a handle assembly 90 (see FIG. 1). In particular, manual guidance of the mower 100 may be used during the training mode to allow the mower to "learn" the work region or a boundary associated therewith. The handle assembly 90 may, in some embodiments, extend outward and upward from the rear end portion 136 of the mower 100 in a manner consistent with a conventional walk-behind mower during the training mode, and collapse into the mower housing 102 (see FIG. 4) during autonomous mower operation as described in, for example, PCT Pub. No. WO2020/033522.

As stated elsewhere herein, "mower sensors" may include vision-based sensors (e.g., cameras 133), as well as non-vision-based sensors that again may include, among others, the IMU 111, wheel encoders 118, and GNSS receiver 116. Sensor data from the mower sensors may be provided to a sensor fusion module as described in the '208 Publication. The sensor fusion module may provide an estimated pose of the autonomous machine based on data from the mower sensors. For example, the sensor fusion module may estimate a non-vision-based pose based on data from non-vision based sensors, of which such pose may be corrected or updated using a vision-based pose estimate based on data from the vision-based sensors of the vision system.

As further described in the '208 Publication, image data from the one or more cameras 133 may be captured and stored as training images during the training mode. The image data may include images and corresponding time stamps. Also, during the training mode, non-vision-based data may be recorded, which may include timestamped non-vision-based data. Any combination of non-vision-based data may be used. In other embodiments, non-vision-based data may be optional. While described herein as using vision-based data to update mower position or pose, other embodiments may update based upon non-vision-based sensor data. For example, GNSS data could be used to facilitate updating or correcting an estimated pose (which may be based on non-vision-based pose data and/or vision-based pose data). In some embodiments, the GNSS data may be augmented using GNSS-specific correction data, such as real-time kinematics (e.g., "GPS-RTK") data. GPS-RTK data may provide a more accurate or precise location that corrects for anomalies in GPS timing compared to nominal GPS data.

Figure 5:
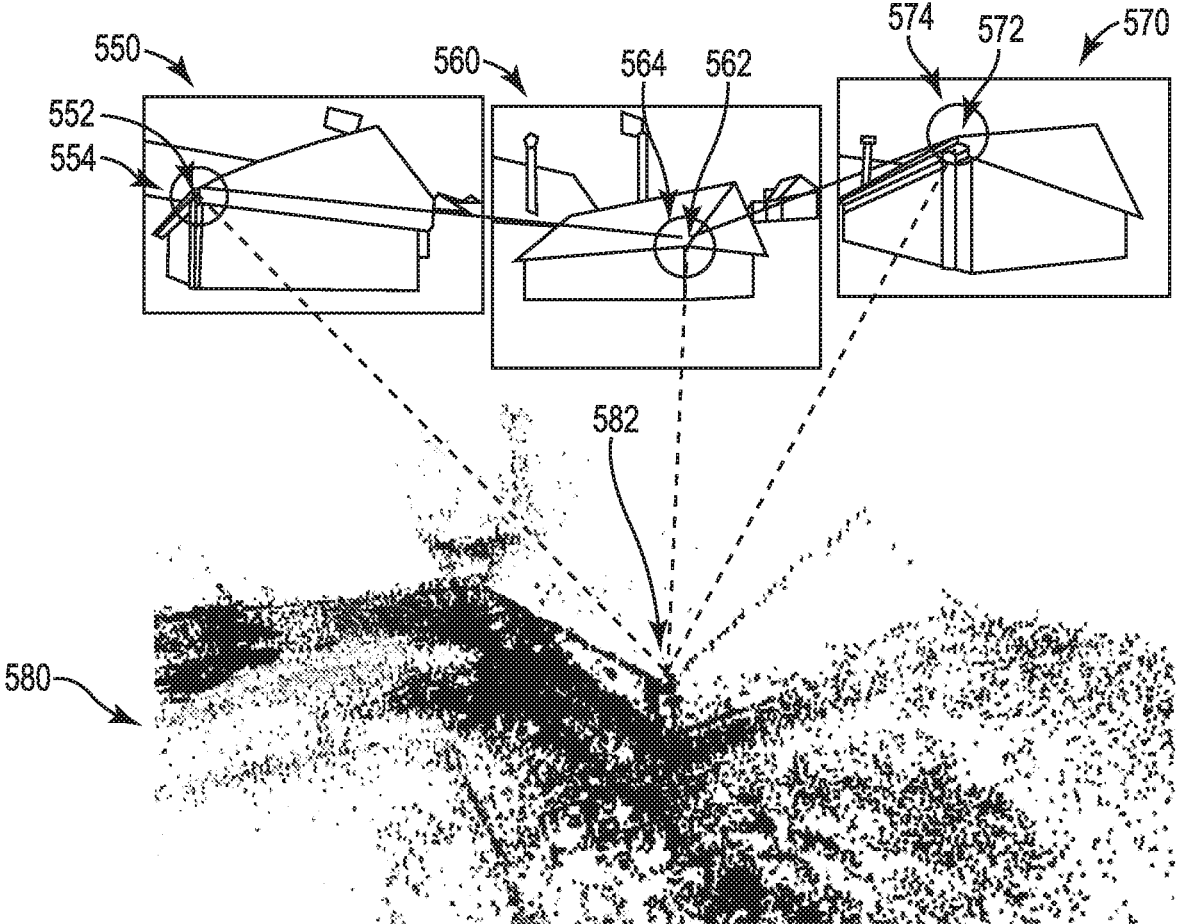
FIG. 5 is an exemplary diagrammatic illustration of using training images to generate a three-dimensional point cloud (3DPC)

FIG. 5 illustrates a series of timestamped images 550, 560, 570 and a 3DPC 580 to illustrate one example of visual map building that may be executed by the vision system 129/controller 120 operating within a work region. As shown in this figure, a key point may be identified as a two-dimensional feature 552, 562, 572 in respective image 550, 560, 570 by, for example, using a feature detector algorithm. Each feature 552, 562, 572 is extracted and a descriptor algorithm may be applied to generate a multi-dimensional descriptor 554, 564, 574 associated with the respective feature 552, 562, 572. The descriptors 554, 564, 574 are illustrated as circles around the respective feature 552, 562, 572. The features 552, 562, 572 and the descriptors 554, 564, 574 may be included in feature data.

During feature matching, a feature matching algorithm may be used to determine that the features 552, 562, 572 are sufficiently similar based on the descriptors 554, 564, 574 that the features may be matched in matching data.

During visual map building, a map building technique may be applied to the feature data and the matching data to identify a three-dimensional point 582 in the 3DPC 580 that corresponds to the features 552, 562, 572. Each point of the 3DPC 580 may be determined in a similar manner.

Any suitable feature matching algorithm available to one of ordinary skill in the art may be used depending on the particular autonomous machine and application. Non-limiting examples of suitable algorithms include Brute-Force, Approximate Nearest Neighbor (ANN), and Fast Library for Approximate Nearest Neighbor (FLANN). The Brute-Force algorithm may match features by selecting one feature and checking all other features for a match. A feature matching module may provide and store matching data in a data structure based on the results of the feature matching algorithm.

The output of the feature matching module and/or the matching data stored in the data structure may be provided to a visual map building module. The visual map building module may utilize a map building technique to create a 3DPC. In general, the techniques described herein that generate a 3DPC using vision-based sensors may be described as a Structure from Motion (SfM) technique or Simultaneous Localization and Mapping (SLAM) technique, either of which may be used with various embodiments of the present disclosure, for example, depending on the particular autonomous machine and application.

The output of the visual map building module and/or the 3DPC and associated data may be provided to a map registration module. Optionally, the non-vision-based data, such as GNSS data, IMU data, and odometry data, from the data structure may also be provided to the map registration module. The map registration module may determine and provide pose data based on a registered map, which may be provided to and used by the navigation system. In some embodiments, pose data is provided from the map registration module to the navigation system. The pose data may be estimated vision-based pose data. The registered map may also be provided to and stored in a data structure.

As used herein, the term "registered map" refers to a 3DPC that has been tied to a real-world reference (e.g., World Geodetic System 1984 or "WGS 84") scale, real-world orientation, or both. In some embodiments, a registered map may be tied to a real-world map or frame of reference. For example, a GNSS may be used to tie the 3DPC to a real-world mapping service, such as GOOGLE MAPS™. In some embodiments, when using techniques described herein, the 3DPC may generally be scaled from about 0.5 times up to about 2 times when registered to a real-world map or frame of reference. However, scaling is generally not limited to these ranges. Once again, exemplary aspects of 3DPC development, feature matching, map building, and map registration are described in more detail in the '208 Publication.

As stated above, the limited onboard computing resources (e.g., processor capability and battery power) present on a mobile platform like the mower 100 may impede the mower's ability to process large amounts of data in real-time during feature matching. While transferring some or all of this processing load to the remote computer 119 or server 52 (see FIG. 1) may partially alleviate this burden, communication bandwidth and power requirements may still present problems. To address this issue, embodiments of the present disclosure provide systems and methods that reduce onboard computing resource utilization (e.g., for image processing (feature matching and visual odometry)) without significant performance degradation of the vision system. In some embodiments, this may be accomplished by selecting a subset of each camera's field of view for analysis during feature matching as further described below. In addition or alternatively, only a certain camera or cameras may be selected at any given time for feature matching. In addition to reducing the workload during feature matching, such camera selection processes may increase machine/mower platform flexibility in that the other cameras 133 (those cameras not being used for feature matching) may simultaneously be used for other purposes such as visual odometry and object detection/classification.

Figure 6:
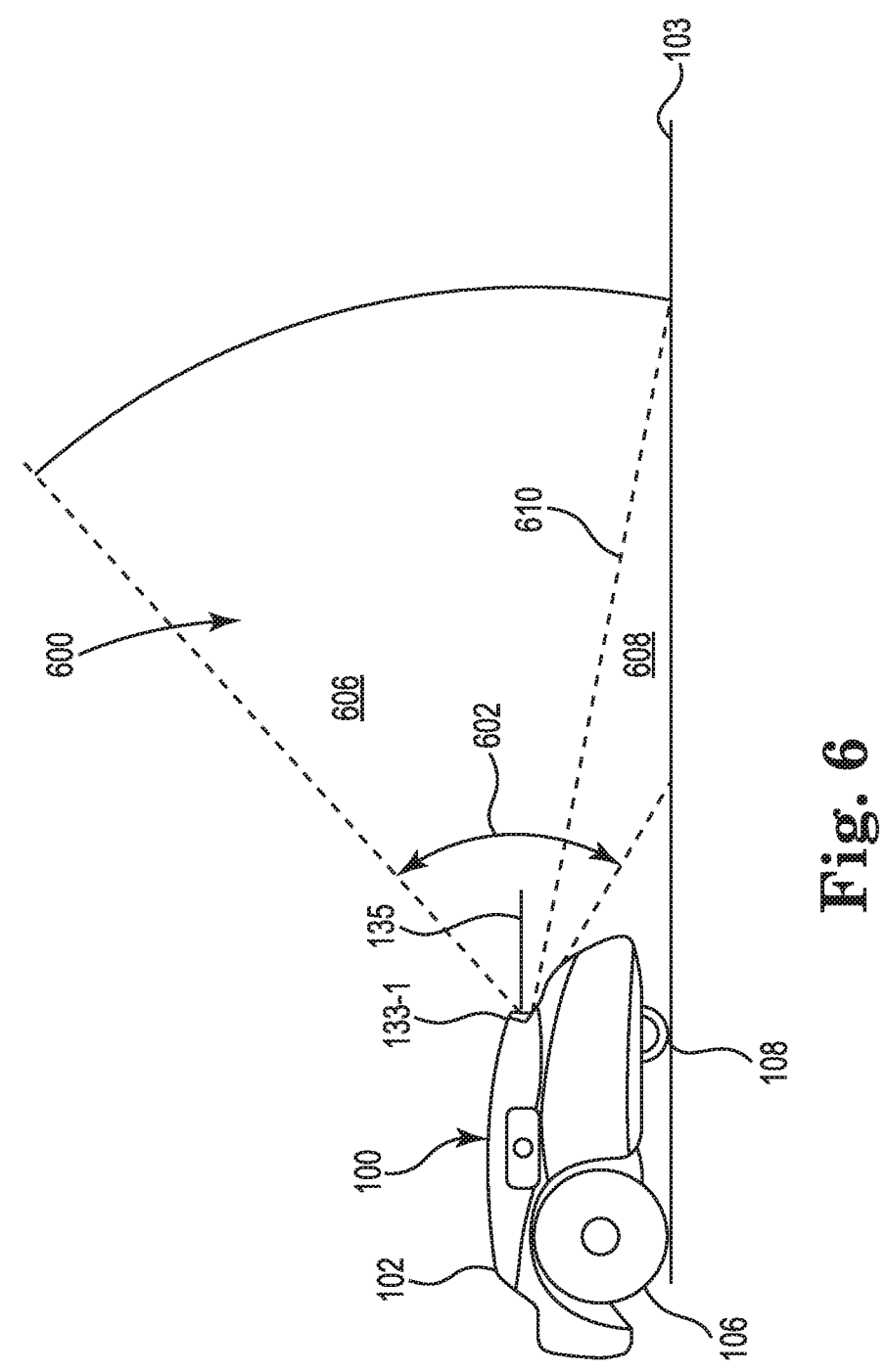
FIG. 6 is a side elevation view of the mower of FIG. 3 illustrating an exemplary vertical field of view of a forward-facing camera of a vision system of the machine.
Figure 8:
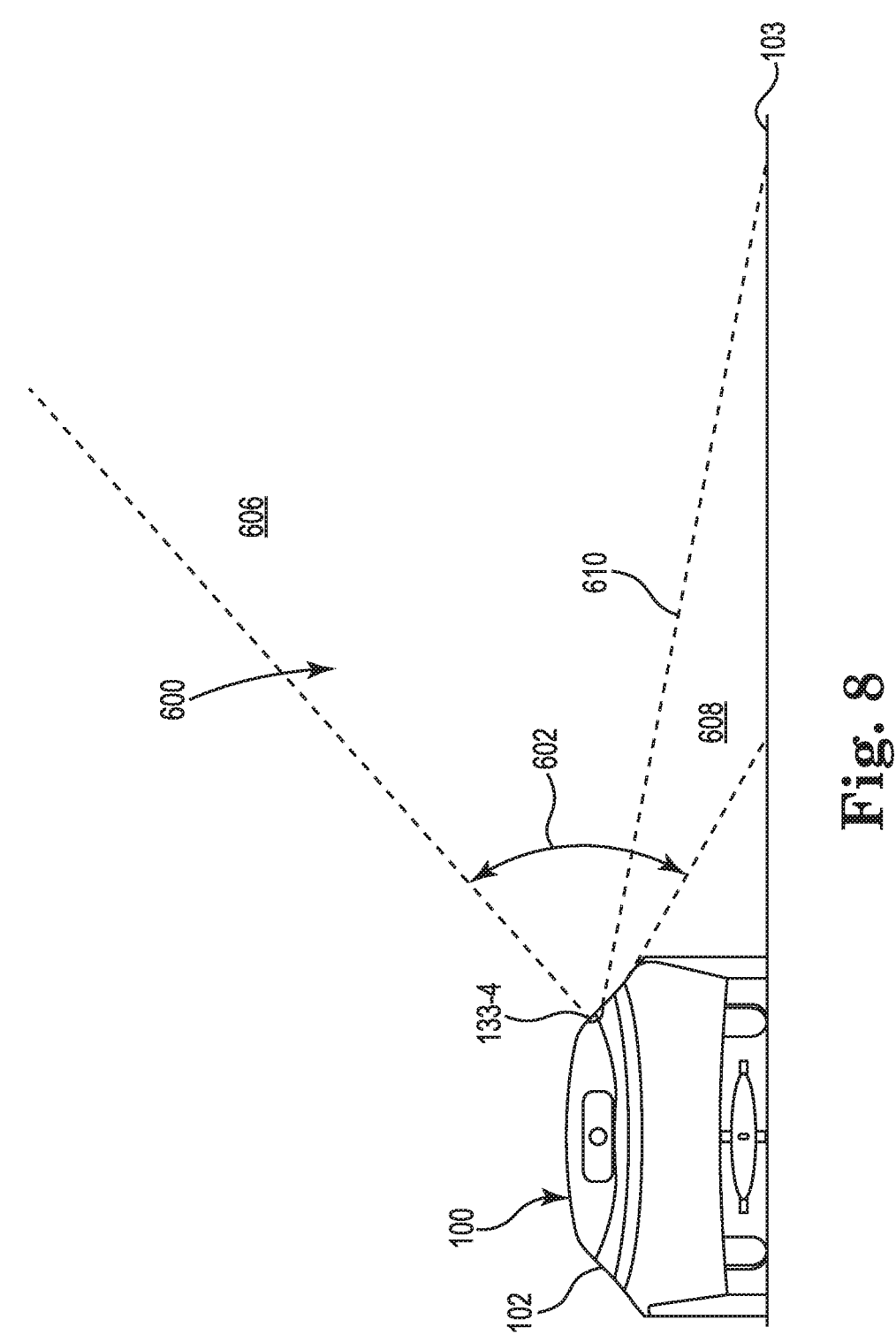
FIG. 8 is a rear elevation view of the mower of FIG. 3 illustrating an exemplary vertical field of view of a side-facing camera.
Figure 10:
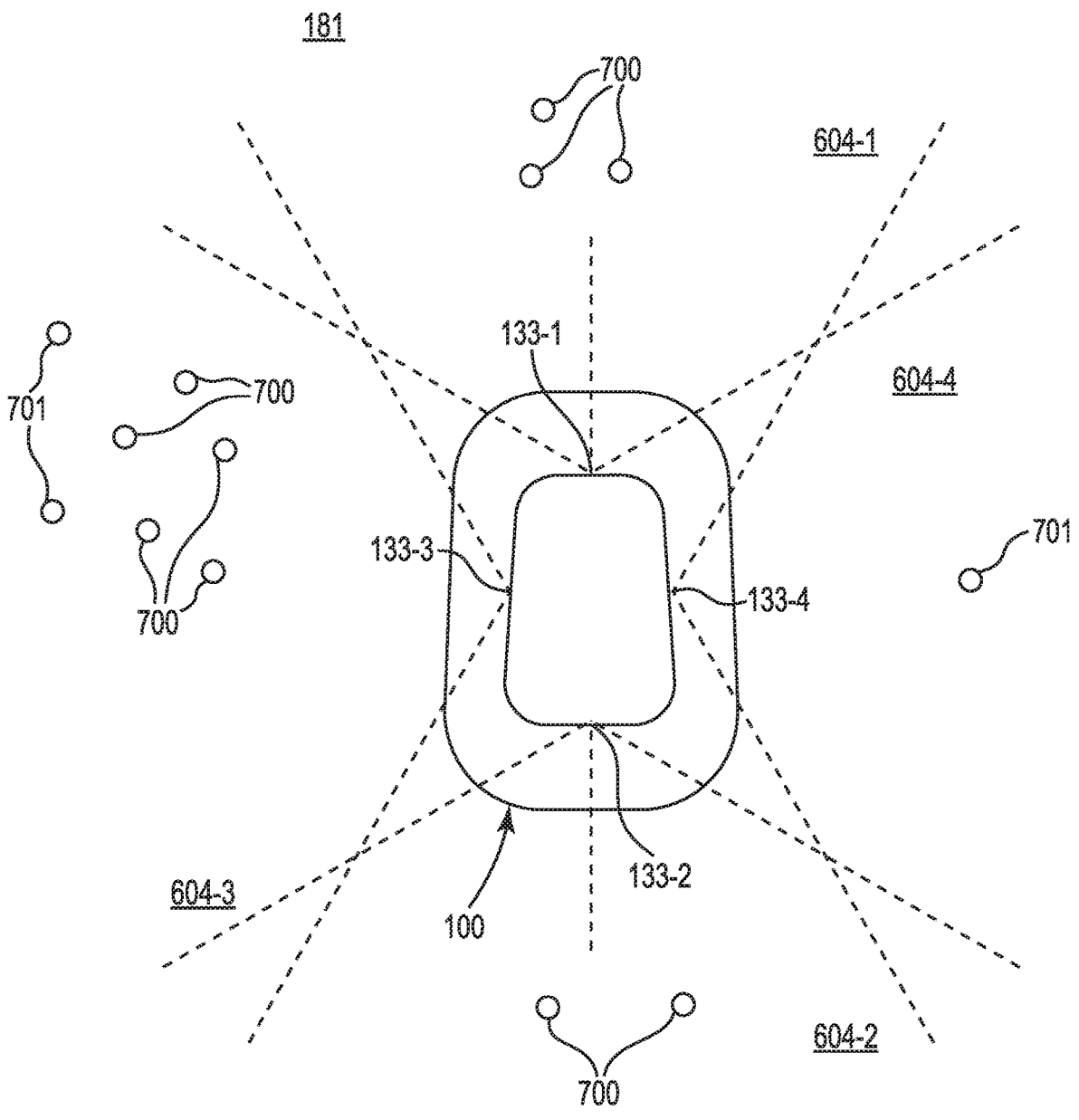
FIG. 10 is a plan view of the mower when in the position within the work region corresponding to FIG. 9.

FIGS. 6 and 8 illustrate the mower 100 and exemplary cameras 133 of the vision system 129. With reference first to FIG. 6, each camera 133 associated with the mower 100 may define a field of view (FOV) 600, the latter being the effective observable area seen by the camera at any given moment (the area within which the camera may capture image data). In the context of any one camera 133, the FOV 600 may be defined by a vertical field of view 602 as shown in FIG. 6, and a horizontal FOV 604 as shown in FIG. 10. As one can appreciate, each camera may define a different FOV relative to the mower 100. It is noted that the various FOVs may be identified in the description and figures with a suffix (e.g., "-1") that corresponds to the suffix of the associated camera (e.g., in FIG. 10, horizontal FOV 604-1 identifies the horizontal FOV of front-facing camera 133-1).

As one can appreciate, features associated with the work region that are used to generate the 3DPC (e.g., trees, fences, buildings, etc.) may typically be "seen" or contained within an upper portion of the FOV 602, while a lower portion is generally directed toward the ground surface 103. While not particularly suited for feature detection/matching due to the potential lack of uniquely distinguishable features on the surrounding ground surface 103, the lower portion of the FOV 602 may provide image data useful for visual odometry (that is, it may be useful for collecting and providing to the controller visual odometry data (from one or more of the cameras), whereby the pose of the mower may be corrected based upon the visual odometry data).

Accordingly, embodiments of the present disclosure may divide or split the vertical FOV 602 of one of more (e.g., all) of the cameras into a first zone 606 and a second zone 608 separated by a virtual boundary 610 such that the first zone is vertically above the second zone as illustrated in FIG. 6, whereby matching features in the image data to features associated with the 3DPC may occur using only the image data from the first zone. While the boundary 610 may be arbitrarily selected, e.g., based upon the camera orientation on the mower housing 102 and the camera's maximum vertical FOV 602, it is in some embodiments selected to reduce the amount of image data (e.g., remove that portion (second zone 608) located at or near the ground surface) to be processed during 3DPC feature matching. That is to say, the image data processed during feature matching may be limited to that image data contained within a first zone 606 of the vertical FOV 602 above the boundary 610.

Although the image data processed is effectively reduced, systems and methods that utilize only a portion of the vertical FOV 602 may still provide sufficient image data for feature matching. That is to say, the location of the boundary 610 may be selected to ensure the first zone 606 captures most or all of the points of the 3DPC (for feature matching) while excluding the less feature-rich second zone 608. Similarly, the second zone 608 may be uniquely situated to provide a subset of the FOV 602 useful for visual odometry, again without the need to analyze the full FOV 602. Stated alternatively, the image data of the first zone of the FOV of each camera may be provided to the controller for matching features with the 3DPC, and the image data of the second zone of the FOV of each camera may be adapted to provide visual odometry data to the controller.

Figure 7:
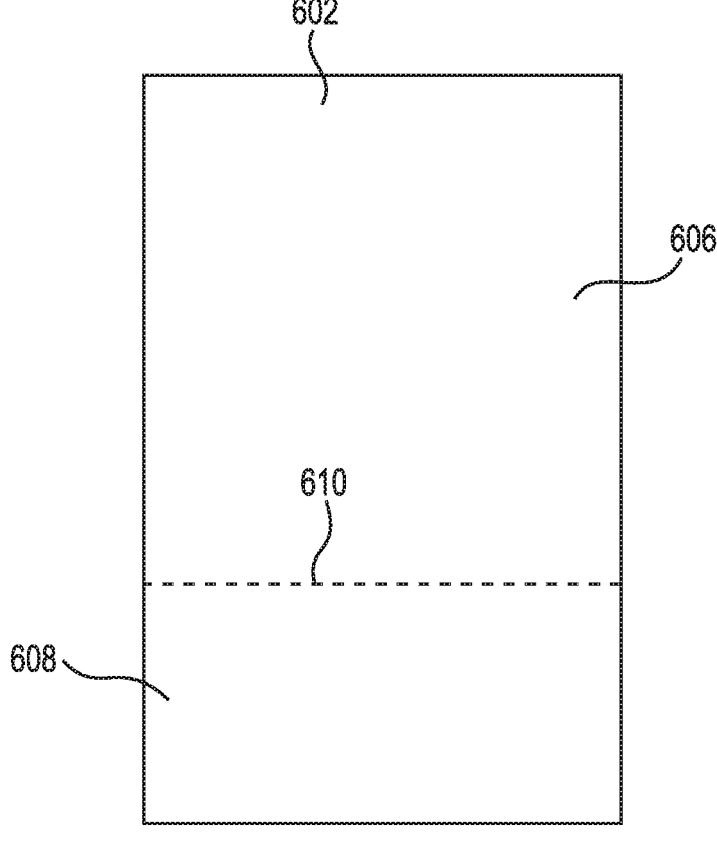
FIG. 7 is a diagrammatic representation of the vertical field of view of FIG. 6 illustrating a first zone and second zone.

In some embodiments, the FOV of each camera may extend 30-60 degrees above a horizontal plane 135 (see FIG. 6) to ensure adequate coverage of 3DPC features. FIG. 7 illustrates a diagrammatic two-dimensional representation of the vertical FOV 602 showing the first and second zones 606, 608 and the boundary 610 therebetween. While shown as rectangular, the actual FOV may be curved along one or more sides.

While FIG. 6 illustrates the exemplary vertical FOV 602 of the front-facing camera 133-1, the remaining cameras 133 may be similarly configured to split their associated vertical FOVs. For example, FIG. 8 is a rear view of the mower 100 showing the vertical FOV 602 of the right-facing camera 133-4. Once again, the FOV of the camera 133-4 (as well as rear- and left-facing cameras 133-2 and 133-3) may be split between first and second zones 606, 608 along the boundary 610. In some embodiments, the angular orientation of the cameras 133 relative to the housing 102 of the mower, and the location of the boundary 610 between zones 606, 608 may be the same or similar. However, in other embodiments, the camera orientation and/or boundary location may be different for the side-facing cameras 133-3 and 133-4 than for the front- and rear-facing cameras 133-1 and 133-2 (e.g., the side-facing cameras may seek to optimize a size of the second zone 608 for visual odometry). In fact, the camera orientations and/or boundary 610 locations may be the same or different for each camera 133. Moreover, the boundary 610 for the vertical FOV of each camera 133 may be fixed or, alternatively, adjustable (e.g., adjusted dynamically by the vision system).

The side cameras (133-3 and 133-4) may be well-suited to designation as visual odometry cameras (that is, well-suited to providing visual odometry data) as they typically have a FOV transverse to a direction of travel of the mower 100. For this reason, the visual odometry camera and the localization camera may be different cameras. However, such a configuration is not limiting as the visual odometry camera and the localization camera may also be the same camera. Regardless, when visual odometry data is utilized, the controller may use such data to determine whether the drive wheels have slipped relative to the ground surface and update the vision-based pose of the machine in response to determining such slippage.

In addition to splitting the vertical FOV as described above, FIGS. 9-12 illustrate systems and methods adapted to further increase platform flexibility and reduce computing resources needed for feature matching.

Figure 9:
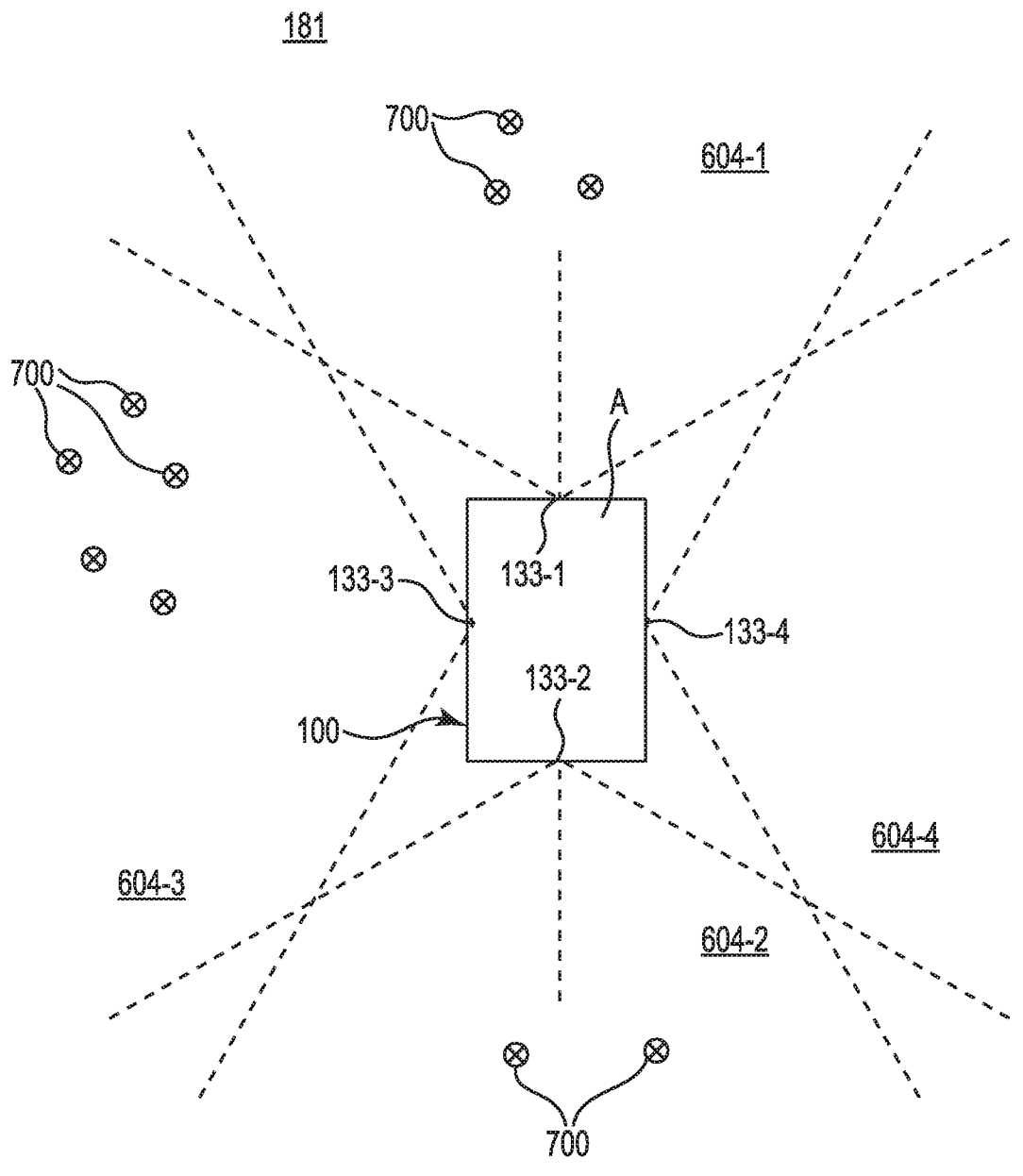
FIG. 9 is a two dimensional diagrammatic overhead or plan view of a 3DPC for one exemplary position of an autonomous working machine (e.g., mower) within a work region.

Referring first to FIG. 9, a partial overhead plan view of 3DPC data, e.g., a two-dimensional overhead map of the 3DPC (features 700) for a particular position of the mower 100 within the work region 181, is illustrated. As shown in this figure, for any position of the mower 100 within the work region, the vision system may overlay the relevant horizontal FOVs for each of the cameras 133, wherein: FOV 604-1 corresponds to the horizontal FOV of front-facing camera 133-1; FOV 604-2 corresponds to the horizontal FOV of rear-facing camera 133-2; FOV 604-3 corresponds to the horizontal FOV of left-facing camera 133-3; and FOV 604-4 corresponds to the horizontal FOV of right-facing camera 133-4. With this overlay, the vision system 129 is able to predict, for any estimated mower position within the work region (e.g., estimated position "A" in FIG. 9), which horizontal FOV 604 contains or "sees" which points/features of the 3DPC.

FIG. 10 is an overhead view of the mower 100 upon reaching the estimated position (such position being estimated, for example, based upon data from the non-vision based sensors) within the work region corresponding to the position A shown in FIG. 9. When the mower is at this estimated position, the cameras 133 may capture at least some features corresponding to features of the 3DPC used to define the work region (more, or less, features than the 3DPC may be detected based upon various factors including, e.g., potential visual interference with the cameras, or the presence of new or temporary objects 701 such as lawn furniture, automobiles, etc.).

For reasons similar to those described above regarding analysis of the vertical FOV 602, executing feature matching algorithms in real-time using image data from all cameras 133 may create an excessive burden on the mower's computing resources. It has been found, however, that this load may be alleviated by knowledge of the locations of 3DPC features relative to the mower 100 at any given estimated mower location within the work region. For example, based upon the mower's estimated position A (see. FIG. 9), the known locations of 3DPC features 700 indicate that horizontal FOV 604-3 of camera 133-3 should capture the greatest number of features of the 3DPC compared to the horizontal FOV of the remaining cameras. As a result, the vision system/controller may designate camera 133-3 as the camera to be used for localization (e.g., the camera 133-3 may be designated as a "localization vision sensor" or "localization camera") without the need to analyze image data from the remaining cameras. Of course, as the mower moves between different positions within the work region, any one (or more) of the cameras 133 may be designated as the localization camera based upon the mower's estimated position and the corresponding 3DPC features contained within (or predicted to be contained within) the various cameras' horizontal FOVs, e.g., the localization camera may change between any one of the camera 133.

As a result, instead of analyzing images from all cameras to correct mower position, the vision system/controller may need only rely on a single camera at any given time, such camera having (or predicted to have) a horizontal FOV containing a greater number of features (as opposed to the other camera(s)) of the 3DPC.

While the number of 3DPC features contained (or predicted to be contained) within the respective horizontal FOVs of the camera 133 may dictate which camera is designated as the localization camera, alternative embodiments may utilize a 3DPC "heat map." The heat map may represent those features, or cluster(s) of features, that over time have been found to be consistently recognizable during feature matching. That is, the vision system may maintain, and periodically update, a recognition score of a feature or cluster of features and build a heat map that represents these scores. Thus the recognition score may generally equate to a success rate of how often a particular feature or cluster of features of the 3DPC is matched to image data during feature matching.

Figure 11:
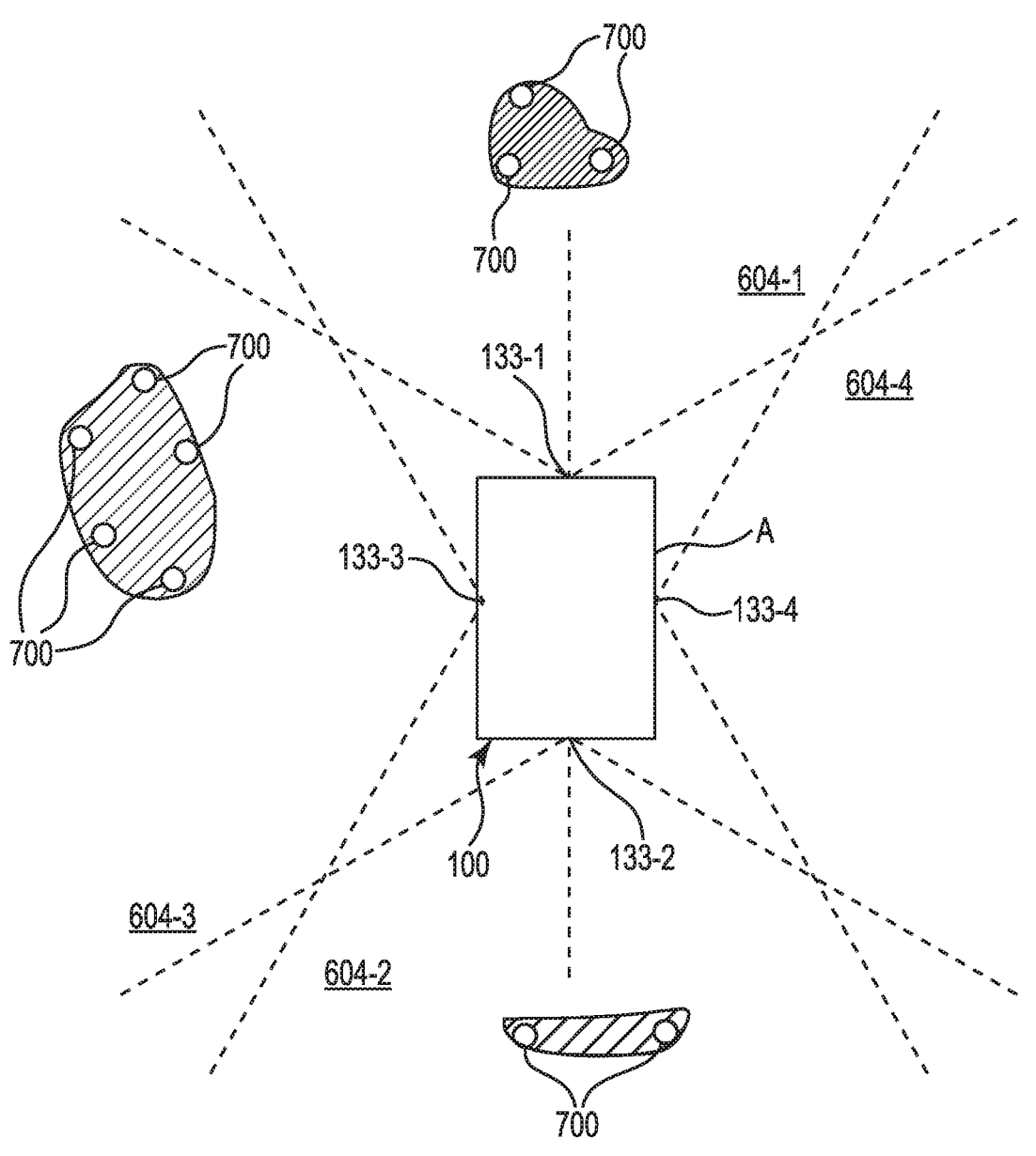
FIG. 11 illustrates an exemplary recognition score or "heat" map of features within the 3DPC.
Figure 12:
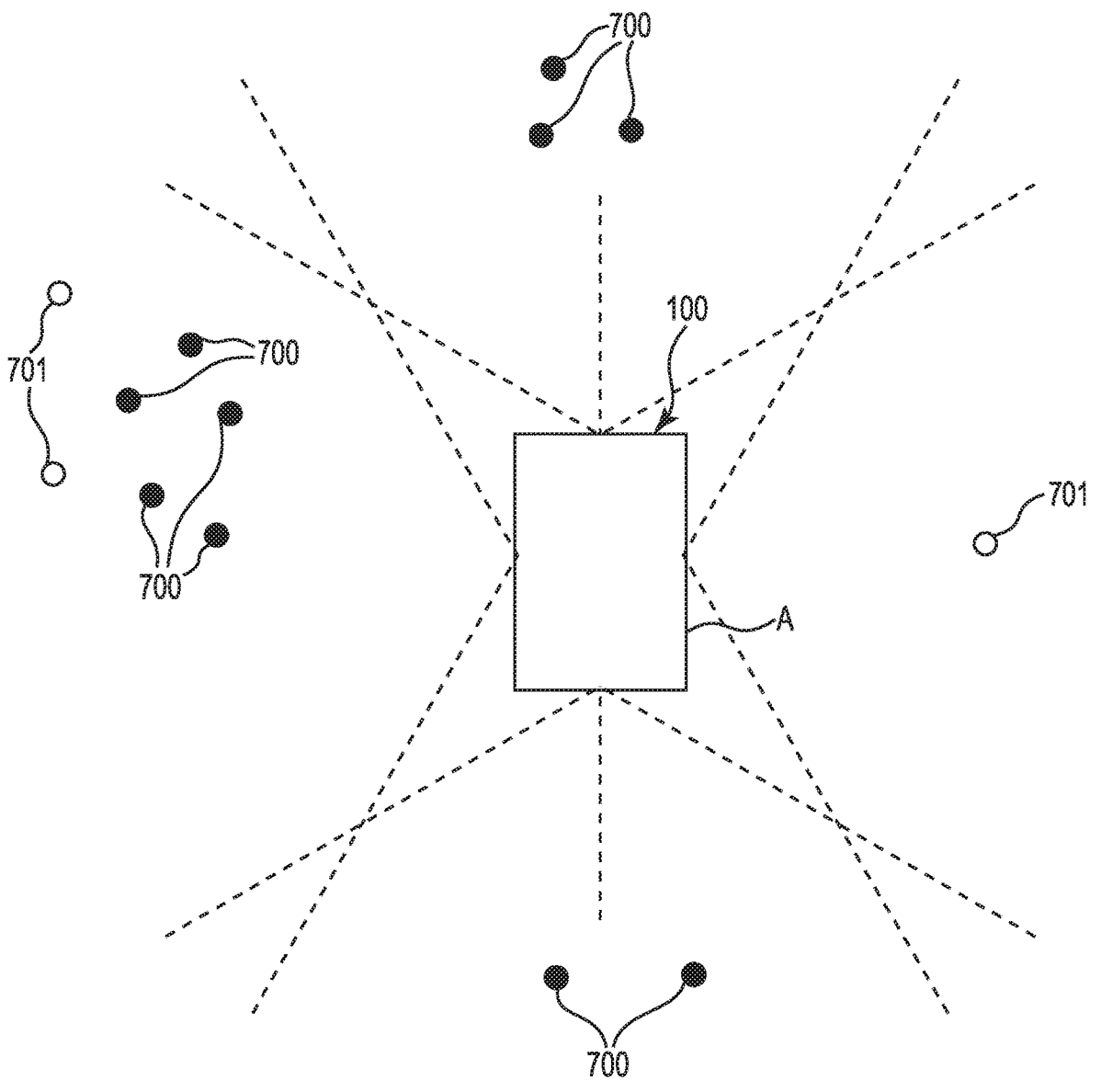
FIG. 12 is a diagrammatic representation of feature mapping between a vision system and the 3DPC for the mower position shown in FIG. 9.

FIG. 11 depicts an exemplary heat map of the 3DPC features relative to the position A of the mower 100 within the work region. As shown in FIG. 11, FOV 604-1 of camera 133-1 may have a feature 700 or cluster of features 700 having a recognition score greater than a recognition score of the feature or cluster of features predicted to be within the FOV 604-3 of camera 133-3, which in turn has a greater recognition score of features or cluster of features than that predicted to be within the FOV 604-2 of camera 133-2. For purposes of illustration, the relative recognition scores are represented by different densities of hatching on the map (higher density hatching indicating higher recognition scores than lighter density hatching).

Accordingly, the vision system may then select, as the localization camera for any given position, the camera (camera 133-1) estimated or predicted to provide a horizontal FOV containing a feature or cluster of features having a recognition score greater than a recognition score of the feature or cluster of features predicted to be within the FOV of the remaining cameras for that mower position.

While FIG. 11 shows the FOV containing the highest scoring features as being different than the FOV having the greatest number of features, such an occurrence is exemplary only (e.g., the highest scoring feature(s) may or may not be found in FOVs containing the greatest number of features).

While selecting the localization camera in accordance with embodiments as described above provides various benefits, selection of the localization camera using these predictive criteria may, in some circumstances, yield image data that provides poor 3DPC feature matches. For example, a temporary object placed in the work region may block the FOV of one or more cameras. Alternatively, the FOV of the preferred localization camera may be partially obstructed by debris or the like, or lighting conditions (e.g., cloud cover, time or day) may adversely affect images captured.

In such instances, the vision system may select the localization camera via alternative methods. For example, in some embodiments, the vision system may simply select the camera having the next highest number of features or next highest recognition score within its horizontal FOV. Alternatively, the vision system may execute feature matching algorithms on image data from two or more of the cameras, either simultaneously or sequentially, until an acceptable localization camera is identified (e.g., until a camera able to match a threshold number of features, or containing a feature or features having a threshold recognition score, is identified).

Such an exemplary alternative process is illustrated in FIG. 12, again for the position A of the mower 100. As shown in this view, the vision system may cycle through each camera individually and execute feature matching algorithms with each camera's image data (i.e., analyze image data from each of the vision sensors). In this figure, feature 700 matches are represented by solid circles 700, while hollow circles 701 indicate unmatched features. After analyzing the image data, the vision system may select the first camera having a FOV that satisfies threshold criteria (e.g., threshold number of features or threshold recognition score of a matched feature(s)). Alternatively, the vision system may wait to select the localization camera until image data from all cameras is analyzed. The system may then identify and select as the localization camera the camera having a FOV containing the greatest number of feature matches to the features associated with the 3DPC (or the camera having an FOV containing the feature(s) with the greatest recognition score(s)).

While selecting the localization camera via image data analysis of multiple cameras requires increased computing resources than the systems and method described elsewhere herein, such methods are an effective alternative when predicative camera selection methods are inadequate. Moreover, as more powerful and energy-efficient computing resources become available, continuous or semi-continuous multiple camera analysis may be an effective alternative for localization camera selection.

As one can appreciate, embodiments in accordance with embodiments of the present disclosure may include a method for autonomous machine navigation, wherein the method includes placing a ground maintenance machine within a work region defined by one or more boundaries. The machine may include: two or more vision sensors or cameras, each vision sensor adapted to collect image data within a FOV defined by the vision sensor, wherein each vision sensor defines a different FOV relative to the machine; and a controller in communication with each of the vision sensors. The method may further include designating at least one of the vision sensors as a localization vision sensor, and determining with the controller a vision-based pose of the machine, wherein the pose may represent one or both of a position and an orientation of the machine relative to the work region. Determining the pose of the machine may be based upon matching features in the image data received from the localization vision sensor/camera to features associated with the previously-identified 3DPC used to define the work region.

The designation of the localization vision sensor or camera may be achieved in different ways. For example, designating the localization vision sensor/camera may include: analyzing the image data from each of the vision sensors; identifying a first vision sensor from among the two or more vision sensors, wherein the FOV of the first vision sensor contains a greater number of feature matches with features of the 3DPC than the FOV of any of the other vision sensors; and selecting the first vision sensor as the localization vision sensor. Alternatively, a predictive method may be used comprising, for example: selecting which of the vision sensors has the FOV that is predicted by the controller to contain either: the greater number of features of the 3DPC; or a feature or cluster of features having a recognition score greater than a recognition score of the features or cluster of features predicted to be within the FOV of any of the other vision sensors/cameras. Another predictive method for designating the localization vision sensor/camera may include: dividing the FOV of each vision sensor/camera into a first zone and a second zone (as described above); predicting, based upon the pose of the machine as estimated by the controller, either a number of features, or a recognition score of features, of the 3DPC contained within the first zone of the FOV of each of the vision sensors; and designating the localization vision sensor to be the vision sensor having the first zone predicted by the controller to contain either: a greatest number of features of the 3DPC; or the greatest recognition score of features of the 3DPC.

Regardless of the process used to designate the localization camera, maintaining optical clarity may ensure that the localization camera is able to capture the expected image data. As a result, cameras in accordance with embodiments of the present disclosure may optionally include features that assist with maintaining image clarity during operation in dusty and debris-filled environments often associated with lawn mowing.

Figure 13:
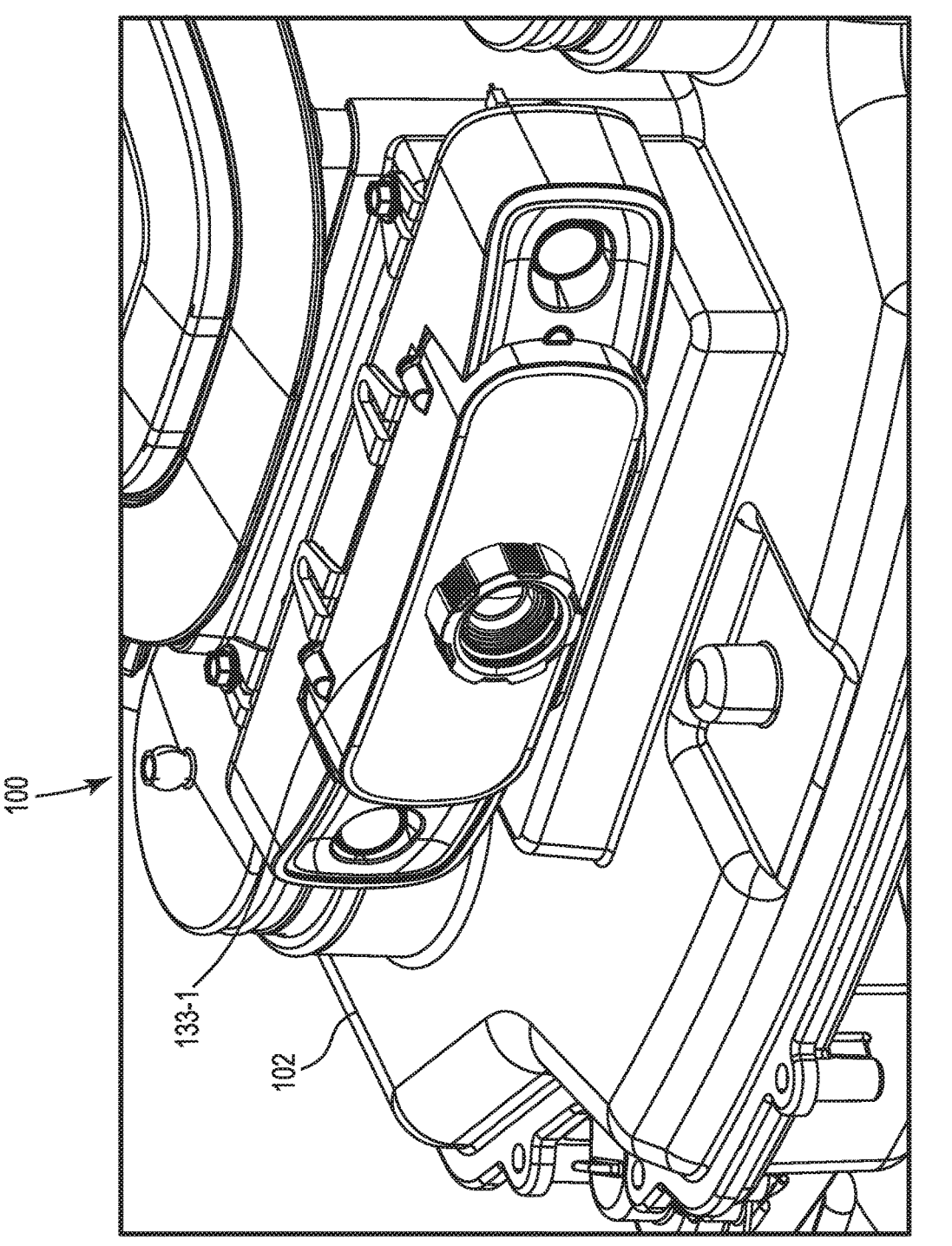
FIG. 13 is a partial perspective view of a mower illustrating a single vision-based sensor (e.g., camera)
Figures 14, 15:
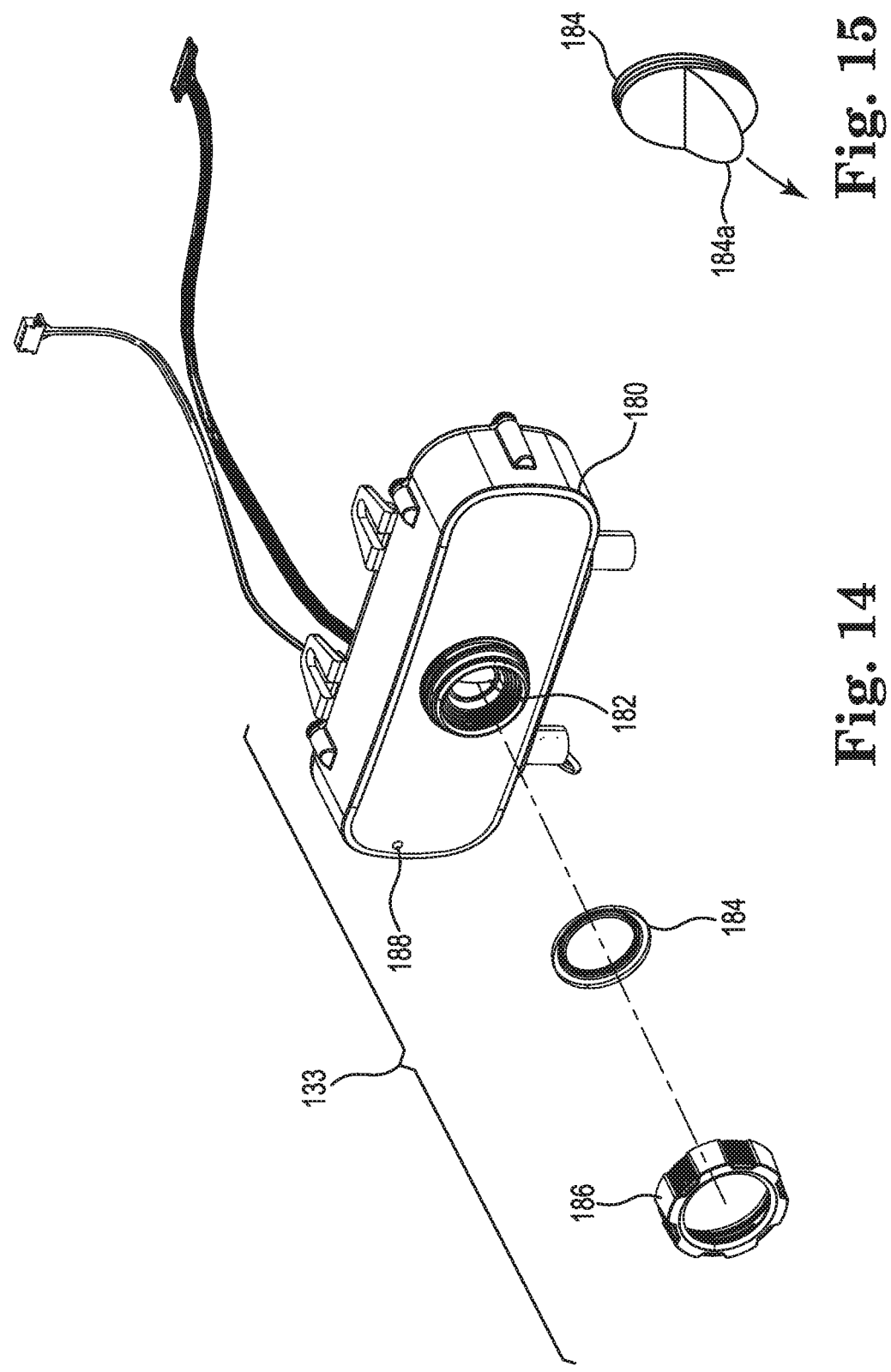
FIG. 14 is an isolated, exploded view of the vision sensor of FIG. 13.
FIG. 15 is an isolated view of a peelable lens (e.g., removable layer) covering in accordance with embodiments of the present disclosure.

FIG. 13 illustrates a partial perspective view of one camera 133 (e.g., front camera 133-1) as attached to the housing 102 of the mower 100, while FIG. 14 illustrates an isolated, exploded view thereof. Each camera may include a housing 180 containing an image sensor and lens 182. A lens covering 184 may be secured over the lens 182 with a retainer 186. A seal (not shown) may resist moisture intrusion past the lens covering 184. In some embodiments, one or more of the cameras 133 may include infrared (visible and/or invisible) illuminators 188 contained with the housing 180.

In some embodiments, the lens covering 184 may form a transparent disk incorporating a hydrophilic coating. Hydrophilic coatings were found to perform well in foggy environments. Hydrophobic coatings were also found to provide similar performance benefits. In addition or alternatively, the covering 184 may provide one or more of anti-reflective, anti-glare, and polarizing properties.

In still other embodiments, the covering 184 may be a multilayer component. Over time, the outermost layer may accumulate dirt and other contaminants, or may otherwise degrade. By using a multilayer component however, the outermost layer 184*a* of the covering 184 may be peeled away from the remaining portion of the covering as shown in FIG. 15, exposing the next layer as the now-outermost layer. This process may be repeated as needed to maintain optical clarity for the vision sensor. When the covering is exhausted, a new multilayer covering may be installed and the process repeated.

In addition to the multilayer concept, the lens covering may instead be removed and either replaced or cleaned as needed. For example, the retainer 186 may be unscrewed from the lens mount and the lens covering removed/replaced.

Accordingly, one or more of the vision sensors/cameras may include a lens covering, wherein the lens covering includes one or more of a hydrophilic lens covering, a hydrophobic lens covering, an anti-reflective lens covering, an anti-glare lens covering, a polarizing filter, and one or more removable layers.

While shown as a separate component, the lens covering may be a film applied to the lens itself. Alternatively, the camera housing 180 may be located behind a transparent window, wherein the window includes a film or coating like those described above.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A method for autonomous machine navigation comprising:

placing a ground maintenance machine within a work region defined by one or more boundaries, the machine comprising:

two or more vision sensors, each vision sensor adapted to capture image data within a field of view (FOV) defined by the vision sensor, wherein each vision sensor defines a different FOV relative to the machine; and a controller in communication with each of the vision sensors;

designating at least one of the vision sensors as a localization vision sensor; and determining with the controller a vision-based pose of the machine, the pose representing one or both of a position and an orientation of the machine relative to the work region, wherein determining the pose of the machine is based upon matching features in the image data received from the localization vision sensor to features associated with a previously-identified three-dimensional point cloud (3DPC) used to define the work region, wherein designating at least one of the vision sensors as the localization vision sensor comprises either:

(a) analyzing the image data from each of the vision sensors;

identifying a first vision sensor from among the two or more vision sensors, wherein the FOV of the first vision sensor contains a greater number of feature matches with features of the 3DPC than the FOV of any of the other vision sensors; and selecting the first vision sensor as the localization vision sensor; or (b) selecting which of the vision sensors has the FOV that is predicted by the controller to contain either: a greater number of features of the 3DPC; or a feature or cluster of features having a recognition score greater than a recognition score of the features or cluster of features predicted to be within the FOV of any of the other vision sensors.

2. The method of claim 1, wherein designating the localization vision sensor comprises selecting which of the vision sensors has the FOV that is predicted by the controller in accordance with element (b) above and further comprises:

dividing the FOV of each vision sensor into a first zone and a second zone;

predicting, based upon the pose of the machine as estimated by the controller, either the number of features, or the recognition score of features, of the 3DPC contained within the first zone of the FOV of each of the vision sensors; and designating the localization vision sensor to be the vision sensor having the first zone predicted by the controller to contain either: the greatest number of features of the 3DPC; or the greatest recognition score of features of the 3DPC.

3. The method of claim 1, wherein matching features in the image data comprises:

dividing the FOV of one or more of the vision sensors into a first zone and a second zone; and matching features in the image data to features associated with the 3DPC using only the image data from the first zone.

4. The method of claim 3, wherein dividing the FOV comprises dividing the FOV such that the first zone is located vertically above the second zone.

5. The method of claim 1, further comprising:

collecting visual odometry data from one or more of the vision sensors; and correcting the pose of the machine based upon the visual odometry data.

6. An autonomous ground maintenance machine comprising:

a housing supporting a ground maintenance implement;

drive wheels supporting the housing in rolling engagement with a ground surface of a work region;

a propulsion system coupled to the drive wheels and adapted to control rotational speed and direction of the drive wheels;

a vision system comprising at least two cameras, wherein each camera captures image data within a field of view (FOV) different than the FOV of the other camera(s), and wherein one of the cameras is designated as a localization camera and one of the cameras is designated as a visual odometry camera; and a controller operatively coupled to the vision system, wherein the controller is adapted to determine a vision-based pose of the machine, the pose representing one or both of a position and an orientation of the machine relative to the work region, and wherein the determination of the pose is based upon matching features in the image data from the localization camera to features associated with a previously-identified three-dimensional point cloud (3DPC) used to define the work region, wherein the visual odometry camera is adapted to provide visual odometry data to the controller.

7. The machine of claim 6, wherein the visual odometry camera has a FOV directed transverse to a direction of travel of the machine.

8. The machine of claim 6, wherein the localization camera and the visual odometry camera are the same camera.

9. The machine of claim 6, wherein the localization camera and the visual odometry camera are different cameras.

10. The machine of claim 6, wherein the controller is adapted to:

determine whether the drive wheels have slipped relative to the ground surface based upon the visual odometry data; and update the vision-based pose of the machine in response to determining that the drive wheels have slipped.

11. The machine of claim 6, wherein the FOV of each camera is divided into a first zone and a second zone.

12. The machine of claim 11, wherein the image data of the first zone of the FOV of each camera is provided to the controller for matching features with the 3DPC, and the image data of the second zone of the FOV of each camera is adapted to provide the visual odometry data to the controller.

13. The machine of claim 6, wherein the FOV of each camera extends 30-60 degrees above a horizontal plane.

14. The machine of claim 6, wherein one or more of the cameras comprises a lens covering, the lens covering comprising one or more of hydrophilic lens covering, a hydrophobic lens covering, an anti-reflective lens covering, an anti-glare lens covering, a polarizing filter, and one or more removable layers.

* * * * *